(12) United States Patent
Malekakhlagh et al.

(10) Patent No.: US 11,989,621 B2
(45) Date of Patent: May 21, 2024

(54) TILING OF CROSS-RESONANCE GATES FOR QUANTUM CIRCUITS

(71) Applicant: International Business Machines Corporation, Armonk, NY (US)

(72) Inventors: Moein Malekakhlagh, Elmsford, NY (US); Jared Barney Hertzberg, Yorktown Heights, NY (US); Easwar Magesan, Mount Kisco, NY (US); Antonio Corcoles-Gonzalez, Mount Kisco, NY (US); Maika Takita, Croton-on-Hudson, NY (US); David C. Mckay, Ossining, NY (US); Jason S. Orcutt, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 323 days.

(21) Appl. No.: 17/369,376

(22) Filed: Jul. 7, 2021

(65) Prior Publication Data
US 2023/0010740 A1    Jan. 12, 2023

(51) Int. Cl.
*G06N 10/00*        (2022.01)

(52) U.S. Cl.
CPC .................... *G06N 10/00* (2019.01)

(58) Field of Classification Search
CPC ................................................... G06N 10/00
See application file for complete search history.

(56) References Cited

U.S. PATENT DOCUMENTS

| | | |
|---|---|---|
| 9,111,230 B2 | 8/2015 | Gambetta et al. |
| 9,178,154 B2 | 11/2015 | Bunyk |
| 9,858,531 B1 | 1/2018 | Monroe et al. |
| 10,248,491 B1 | 4/2019 | Zeng et al. |

(Continued)

FOREIGN PATENT DOCUMENTS

| | | |
|---|---|---|
| WO | 2017021714 A1 | 2/2017 |
| WO | 2018063139 A1 | 4/2018 |
| WO | 2018236922 A1 | 12/2018 |

OTHER PUBLICATIONS

Hertzberg et al., Laser-annealing Josephson Junctions for yielding scaled-up superconducting quantum processor, Sep. 23, 2020 (Year: 2020).*

(Continued)

*Primary Examiner* — Nghia M Doan
(74) *Attorney, Agent, or Firm* — Amin, Turocy & Watson, LLP

(57) ABSTRACT

Techniques regarding tiling a CR gate configuration to one or more lattices characterizing quantum circuit topologies are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a tiling component that can generate a cross-resonance gate configuration that delineates a control qubit assignment and a target qubit assignment in conjunction with a frequency allocation onto a lattice characterizing a quantum circuit topology.

20 Claims, 16 Drawing Sheets

(56) References Cited

U.S. PATENT DOCUMENTS

| | | | |
|---|---|---|---|
| 10,622,536 | B2 | 4/2020 | Chow et al. |
| 10,720,563 | B1 | 6/2020 | Jeffrey et al. |
| 10,956,829 | B1 * | 3/2021 | Wei .................. G06N 10/00 |
| 11,244,241 | B1 * | 2/2022 | Gambetta .......... H03K 19/1952 |
| 2018/0225586 | A1 * | 8/2018 | Chow ................ H03K 19/1958 |
| 2020/0161529 | A1 | 5/2020 | Chow et al. |
| 2020/0272929 | A1 | 8/2020 | Mckay et al. |
| 2020/0401925 | A1 * | 12/2020 | Hertzberg ............ G06F 30/30 |

OTHER PUBLICATIONS

Loft, Niels Jacob Soe et al. | Quantum interference device for controlled two-qubit operations, npj Quantum Information (2020) 6:47; https://www.nature.com/articles/s41534-020-0275-3.

Magesan, Easwar et al. | Effective Hamiltonian models of the cross-resonance gate. Phys. Rev. A 101, 052308, Published May 5, 2020.

Chamberland, Christopher et al. | Topological and Subsystem Codes on Low-Degree Graphs with Flag Qubits. Phys. Rev. X 10, 011022, Published Jan. 31, 2020.

Malekakhlagh, Moeim et al. | First-principles analysis of cross-resonance gate operation. Phys. Rev. A 102, 042605, Published Oct. 13, 2020.

Hertzberg, Jared B., et al. | Laser-annealing Josephson junctions for yielding scaled-up superconducting quantum processors. arXiv:2009.00781 (2020).

Rigetti, et al., "Fully microwave-tunable universal gates in superconducting qubits with linear couplings and fixed transition frequencies," Phys. Rev. B 81, 134507—Published Apr. 5, 2010, 7 pages.

Tripathi, Rahul et al. | Role of Defect-Induced Interfacial States in Molecular Sensing: Ultrahigh-Sensitivity Region for Molecular Interaction. Phys. Rev. Applied 14, 054014, Published Nov. 9, 2020.

Gambetta, et al., "Quantum Device Facilitating a Cross-Resonance Operation in a Dispersive Regime," U.S. Appl. No. 17/027,324, filed Sep. 21, 2020, 67 pages.

Mell, et al., "The NIST Definition of Cloud Computing," NIST Special Publication 800-145, Sep. 2011, 7 pages.

* cited by examiner

1102

| CR specifications | $Q_1 \to Q_2$ | $Q_2 \to Q_3$ | $Q_3 \to Q_2$ | $Q_3 \to Q_4$ | $Q_4 \to Q_5$ | $Q_5 \to Q_4$ |
|---|---|---|---|---|---|---|
| Region | II | III | II | III | II | III |
| $\Delta_{cf}$ (MHz) | 80 | 200 | 80 | 200 | 100 | 180 |
| $J$ (MHz) | 2 | 2 | 2 | 2 | 2 | 2 |
| $\Omega$ (MHz) | 50 | 50 | 50 | 50 | 50 | 50 |
| $IX$ (MHz) | 0.344 | 0.511 | 0.342 | 0.512 | 0.378 | 0.563 |
| $IZ$ (MHz) | -0.015 | 0.003 | -0.015 | 0.003 | -0.010 | 0.004 |
| $ZI$ (MHz) | -16.569 | -13.785 | -16.529 | -13.806 | -14.893 | -15.747 |
| $ZX$ (MHz) | -1.091 | -1.026 | -1.088 | -1.028 | -1.032 | -1.148 |
| $ZZ$ (MHz) | 0.013 | 0.034 | 0.012 | 0.034 | 0.016 | 0.039 |
| Echo error | $8.597 \times 10^{-5}$ | $7.871 \times 10^{-5}$ | $8.512 \times 10^{-5}$ | $7.890 \times 10^{-5}$ | $5.531 \times 10^{-5}$ | $8.684 \times 10^{-5}$ |

1104  1108

| Control-spectator | $Q_1 \to Q_2$ $\downarrow$ $Q_3$ | $Q_1 \to Q_2$ $\downarrow$ $Q_4$ | $Q_2 \to Q_3$ $\downarrow$ $Q_1$ | $Q_3 \to Q_2$ $\downarrow$ $Q_4$ | $Q_3 \to Q_4$ $\downarrow$ $Q_2$ | $Q_3 \to Q_4$ $\downarrow$ $Q_5$ | $Q_4 \to Q_5$ $\downarrow$ $Q_3$ | $Q_5 \to Q_4$ $\downarrow$ $Q_3$ | $Q_5 \to Q_4$ $\downarrow$ $Q_3$ |
|---|---|---|---|---|---|---|---|---|---|
| $\ast \Delta_{cf}$ (MHz) | 80 | 80 | 200 | 80 | 200 | 200 | 100 | 180 | 180 |
| $\ast \Delta_{cs}$ (MHz) | -120 | -20 | 280 | 280 | 120 | 100 | 20 | -100 | 280 |
| $\Delta_{cf} = 2\Delta_{cs} + 3\alpha_c$ (MHz) | -830 | -830 | -590 | -830 | -590 | -590 | -790 | -790 | -510 |
| $\Delta_{cf} = \Delta_{cs} + 3\alpha_c$ (MHz) | -580 | -580 | -460 | -580 | -460 | -460 | -560 | -560 | -460 |
| $\Delta_{cf} = \alpha_c$ (MHz) | -330 | -330 | -330 | -330 | -330 | -330 | -290 | -290 | -330 |
| $\Delta_{cf} = \Delta_{cs} + \alpha_c$ (MHz) | -250 | -250 | -130 | -250 | -130 | -130 | -230 | -230 | -110 |
| $\Delta_{cf} = 2\Delta_{cs} + \alpha_c$ (MHz) | -170 | -170 | 70 | -170 | 70 | $\ast_f$ 70 | -130 | $\ast_f$ -130 | 70 |
| $\Delta_{cf} = 0$ (MHz) | 0 | $\ast_s$ 0 | 0 | 0 | 0 | 0 | $\ast_s$ 0 | 0 | 0 |
| $\Delta_{cf} = \Delta_{cs}$ (MHz) | 80 | 80 | 200 | 80 | 200 | 200 | 100 | 100 | 180 |
| $\Delta_{cf} = \Delta_{cs} + \alpha_c - \alpha_s$ (MHz) | 80 | 40 | 200 | 80 | 200 | 100 | 100 | 100 | 220 |
| $\Delta_{cf} = -\alpha_s$ (MHz) | 330 | 290 | 330 | 330 | 330 | 290 | 330 | 330 | 330 |
| $\Delta_{cf} = \Delta_{cs} - \alpha_s$ (MHz) | 410 | 370 | 530 | 410 | 530 | 490 | 430 | 430 | 510 |

1106  1110

| Target-spectator | $Q_1 \to Q_2$ $\downarrow$ $Q_3$ | $Q_2 \to Q_3$ $\downarrow$ $Q_1$ | $Q_2 \to Q_3$ $\downarrow$ $Q_4$ | $Q_3 \to Q_2$ $\downarrow$ $Q_1$ | $Q_3 \to Q_2$ $\downarrow$ $Q_4$ | $Q_3 \to Q_4$ $\downarrow$ $Q_5$ | $Q_3 \to Q_4$ $\downarrow$ $Q_2$ | $Q_4 \to Q_5$ $\downarrow$ $Q_3$ | $Q_5 \to Q_4$ $\downarrow$ $Q_3$ |
|---|---|---|---|---|---|---|---|---|---|
| $\ast \Delta_{cf}$ (MHz) | 80 | 200 | 200 | 80 | 80 | 200 | 100 | 180 | 180 |
| $\ast \Delta_{st}$ (MHz) | -200 | 80 | 180 | 200 | 180 | -80 | -180 | 200 | 80 |
| $\Delta_{cf} = -\Delta_{st} + 3\alpha_t$ (MHz) | -1070 | -1190 | -1190 | -1070 | -1070 | -1090 | -1050 | -1050 | -1050 |
| $\Delta_{cf} = -\Delta_{st} + \alpha_t$ (MHz) | -410 | -530 | -530 | -410 | -410 | -530 | -390 | -510 | -510 |
| $\Delta_{cf} = \alpha_t$ (MHz) | -330 | -330 | -330 | -330 | -330 | -330 | -290 | -330 | -330 |
| $\Delta_{cf} = \Delta_{st} + \alpha_t$ (MHz) | -250 | -130 | -130 | -250 | -250 | -130 | -230 | -110 | -110 |
| $\Delta_{cf} = 0$ | 0 | 0 | 0 | 0 | 0 | 0 | 0 | 0 | 0 |
| $2\Delta_{cf} = \alpha_t - \alpha_c$ (MHz) | 0 | 0 | -20 | 0 | -20 | 0 | 20 | 0 | 0 |
| $\Delta_{cf} = \Delta_{st}$ (MHz) | 80 | 200 | $\ast_s$ 200 | 80 | 80 | 200 | 100 | $\ast_s$ 180 | 180 |
| $\Delta_{cf} = -\alpha_t$ (MHz) | 330 | 330 | 290 | 330 | 290 | 330 | 330 | 330 | 330 |
| $\Delta_{cf} = \Delta_{st} - \alpha_t$ (MHz) | 410 | 530 | 490 | 410 | 370 | 530 | 430 | 510 | 510 |

FIG. 11

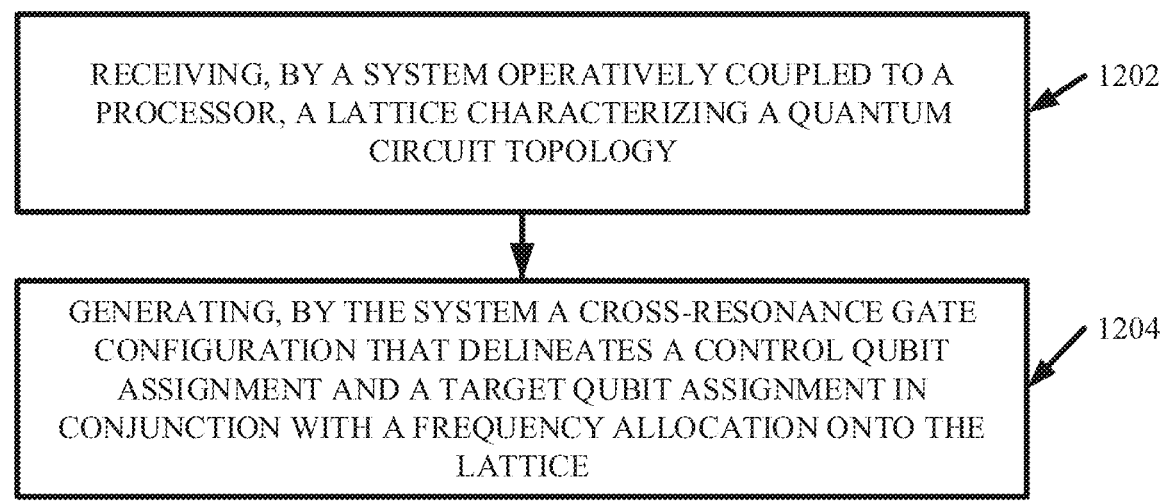

TILING OF CROSS-RESONANCE GATES FOR QUANTUM CIRCUITS

STATEMENT REGARDING FEDERALLY SPONSORED RESEARCH OR DEVELOPMENT

This invention was made with Government support under Contract No.: W911NF-14-1-0124 awarded by the Army Research Office (ARO) and under W911NF-16-0114 awarded by Intelligence Advanced Research Projects Activity. The Government has certain rights in this invention.

BACKGROUND

The subject disclosure relates to tiling cross-resonance gates for a quantum circuit topology, and more specifically, to determining the optimal cross-resonance gate parameters for a given circuit topology that is designed for one or more quantum applications.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can tile cross-resonance gates to one or more lattice structures that characterize the topology of one or more quantum circuits are described.

According to an embodiment, a system is provided. The system can comprise a memory that can store computer executable components. The system can also comprise a processor, operably coupled to the memory, and that can execute the computer executable components stored in the memory. The computer executable components can comprise a tiling component that can generate a cross-resonance gate configuration that delineates a control qubit assignment and a target qubit assignment in conjunction with a frequency allocation onto a lattice characterizing a quantum circuit topology.

According to an embodiment, a computer-implemented method is provided. The computer-implemented method can comprise generating, by a system operatively coupled to a processor, a cross-resonance gate configuration that can delineate a control qubit assignment and a target qubit assignment in conjunction with a frequency allocation onto a lattice characterizing a quantum circuit topology.

According to an embodiment, a computer program product for tiling cross-resonance gates for a quantum circuit topology is provided. The computer program product can comprise a computer readable storage medium having program instructions embodied therewith. The program instructions can be executable by a processor to cause the processor to generate, by the processor, a cross-resonance gate configuration that delineates a control qubit assignment and a target qubit assignment in conjunction with a frequency allocation onto a lattice characterizing the quantum circuit topology.

BRIEF DESCRIPTION OF THE DRAWINGS

FIG. 11 illustrates a diagram of example, non-limiting tables that can characterize operation of one or more cross-resonance gates included in a cross-resonance gate configuration tiled to a lattice characterizing the topology of a quantum circuit in accordance with one or more embodiments described herein.

FIG. 12 illustrates a flow diagram of an example, non-limiting computer-implemented method that can facilitate tiling one or more cross-resonance gate configurations to one or more lattices characterizing the topology of one or more quantum circuits in accordance with one or more embodiments described herein.

DETAILED DESCRIPTION

Figure 1:
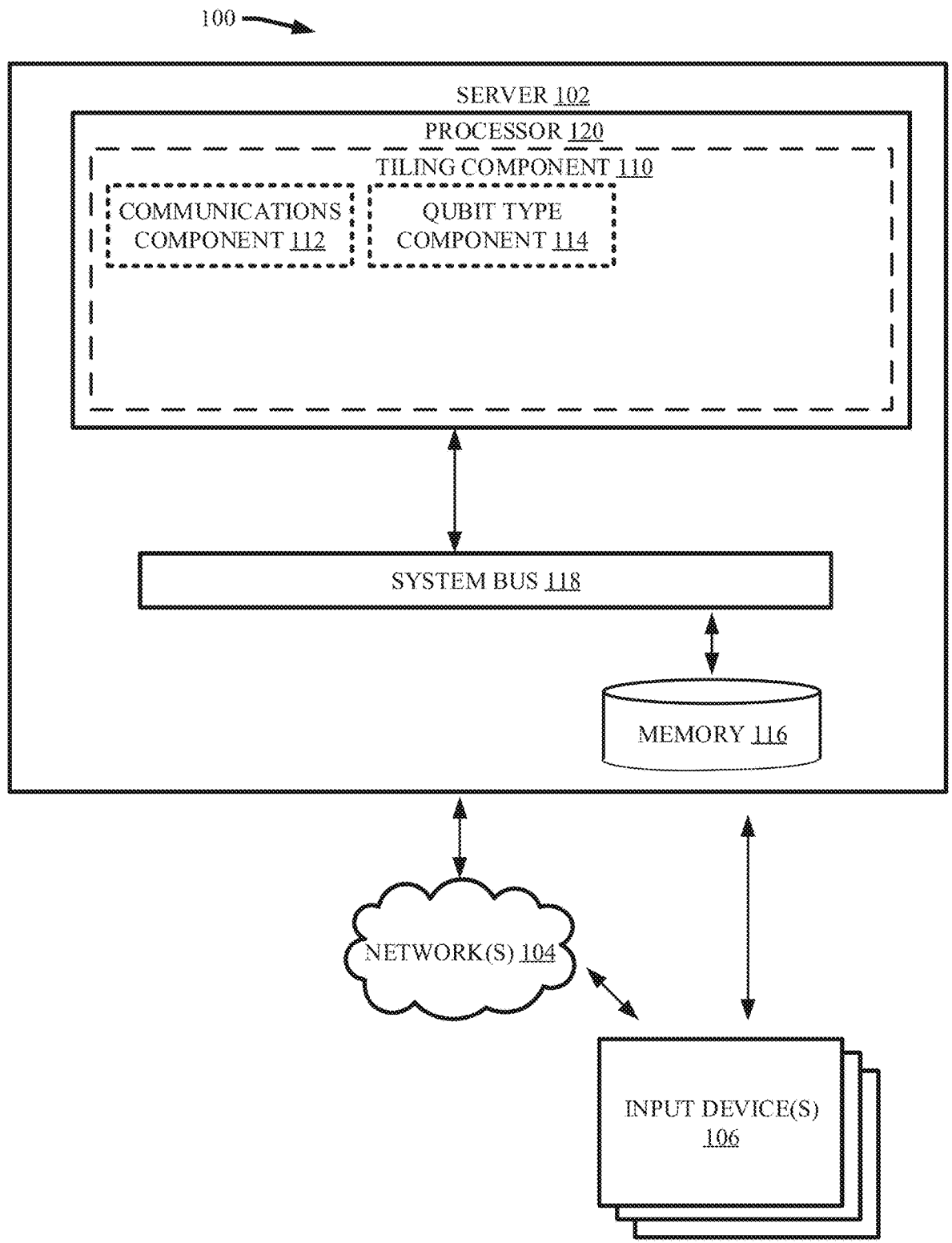
FIG. 1 illustrates a block diagram of an example, non-limiting system that can assign qubit types to a plurality of qubits represented in a lattice that can characterize the topology of a quantum circuit in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum circuits can be designed to execute one or more specific quantum applications. The quantum circuits can include a plurality of superconducting, fixed frequency qubits (e.g., including transmon qubits), which can be used for quantum information processing. Quantum logical operations can be performed by the quantum circuits using quantum logic gates that connect two or more qubits, such as cross-resonance ("CR") gates. CR gates can comprise a control qubit, a target qubit, and a spectator qubit. The control qubit can be driven with microwave pulses at the frequency of the target qubit, where the spectator qubit can be connected to the control and target qubits to influence operation of the CR gate.

The optimal parameters of the CR gate can depend on the topology of the given quantum circuit. Where a quantum circuit comprises multiple CR gates, a tiling operation can be performed to determine a configuration of CR gates, and associate parameters, that can be repeated on a lattice characterizing qubit connectivity of the given quantum circuit. As the number of qubits, and thereby CR gates, in the quantum circuit increases, the complexity of the tiling operation can likewise increase.

Various embodiments of the present invention can be directed to computer processing systems, computer-implemented methods, apparatus and/or computer program products that facilitate the efficient, effective, and autonomous (e.g., without direct human guidance) tiling of CR gates for a given quantum circuit topology. For example, one or more embodiments described herein can tile a configuration of one or more CR gates to a given lattice that characterizes the qubit connectivity of a given quantum circuit. Various embodiments described herein can employ an autonomous tiling operation that uses a minimal number of distinct qubit types to assign parameters for optimal pairwise CR gate operation on a given lattice input. For instance, one or more embodiments described herein can: determine a minimum number of qubit types required to efficiently tile a given lattice; assign control qubit and target qubit roles; assign regions of CR gate operation; allocate CR gate parameters; resolve multi-qubit resonance collisions; and/or analyze instances of near-collisions.

The computer processing systems, computer-implemented methods, apparatus and/or computer program products employ hardware and/or software to solve problems that are highly technical in nature (e.g., autonomous tiling of CR gates), that are not abstract and cannot be performed as a set of mental acts by a human. For example, an individual, or a plurality of individuals, cannot readily determine CR gate configurations for quantum circuits that can comprise dozens, hundreds, or potentially thousands of qubits.

Also, one or more embodiments described herein can constitute a technical improvement over conventional CR gate tiling operations by determining CR gate configurations for any given lattice structure, while minimizing pairwise coherent CR gate error and/or the possibility of unwanted multi-qubit collisions (e.g., due to at least spectator qubits). Additionally, various embodiments described herein can demonstrate a technical improvement over conventional CR gate tiling operations by determining a CR gate configuration that maximizing pairwise CR gate speed for the given lattice. For example, various embodiments described herein exemplify autonomous optimal tiling of CR gates to a heavy-hexagon lattice, which can characterize the topology of a quantum circuit having numerous superconducting qubits.

Further, one or more embodiments described herein can have a practical application by determining CR gate configurations based on the topology of a given quantum circuit, which can vary depending on the quantum application for which the circuit is designed to execute. For instance, various embodiments described herein can employ autonomous tiling operations that can assign CR gate operation regions and qubit frequency allocations to achieve a configuration that optimizes pairwise CR gate operation for each of the CR gates included in the configuration.

FIG. 1 illustrates a block diagram of an example, non-limiting system 100 that can automatically tile one or more CR gates to a given lattice that characterizes a quantum circuit topology. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104 and/or input devices 106. The server 102 can comprise tiling component 110. The tiling component 110 can further comprise communications component 112 and/or qubit type component 114. Also, the server 102 can comprise or otherwise be associated with at least one memory 116. The server 102 can further comprise a system bus 118 that can couple to various components such as, but not limited to, the tiling component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the tiling component 110 can be provided on the one or more servers 102, it should be appreciated that the architecture of system 100 is not so limited. For example, the tiling component 110, or one or more components of tiling component 110, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more lattice structures into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

For example, the one or more input devices 106 can be employed to share one or more lattices with the tiling component 110. In various embodiments, the one or more lattices can characterize the topology of one or more quantum circuits. For instance, the one or more lattices can be represented by a graphical structure comprising a plurality of nodes connected together via one or more lines. Each node can represent a respective qubit of the one or more quantum circuits. Each line between two or more nodes can represent a connection between the qubits represented by the connected nodes. For example, each line can represent an entanglement between qubits represented by the nodes connected to the given line. Thereby, the one or more lattices can describe the qubit connectivity of the one or more quantum circuits. In various embodiments, qubit connections (e.g., delineated by connected nodes in the lattice) can be operated and/or controlled via one or more CR gates. For example, a first node from a pair of connected nodes in the lattice can be associated with the control qubit of a CR gate, and a second node from the pair of connected nodes can be associated with the target qubit of the CR gate. Further, in some instances a third node can be connected to the pair of nodes and can be associated with a spectator qubit. In various embodiments, the qubit connectivity represented by one or more graphical embodiments of the lattice can also be defined in the form of input data shared with the tiling component 110.

In various embodiments, the tiling component 110 can automatically tile a CR gate configuration to the one or more lattices, which can be entered into the system 100 via the one or more input devices 106. Tiling in this regard refers to the process of configuring one or more configurations of CR gates that can be repeated on a given geometrical lattice that characterizes qubit connectivity. To carry out tiling, the tiling component 110 can, for example, utilize a communications component 112 to support communication of data, a qubit type component 114 (described below) to determine the minimum number of distinct qubit types applicable and to assign those qubit types, a role component (described in connection with FIG. 3) to determine control and target roles with regards to each qubit-qubit connection, a region component (described in connection with FIG. 5), a parameter component (described in connection with FIG. 8), and/or a collision component (described in connection with FIG. 10). The tiling process is also discussed further in connection with FIGS. 12 and 13. The tiling process may also define CR gate operation, which can result in a two-qubit ZX rate defined by a difference in the precession rate of the target qubit around the X axis depending on the control qubit being in the ground state or an excited state. In one or more embodiments, as will be discussed further herein below, the tiling component 110 can tile the CR gate configuration so as to maximize the pairwise CR gate speed (e.g., the ZX rate) while minimizing coherent CR gate error (e.g., a difference between ideal implementation of the CR gate and an observed implementation) and multi-qubit collisions (e.g., resonances with neighboring qubits, such as unwanted resonances caused by spectator qubits).

In one or more embodiments, the qubit type component 114 can determine the minimum number of distinct qubit types that can be employed by the CR gate tiling operation, e.g., using Equation 1 described further below. Qubit types can be defined by the frequency pattern of a qubit. For example, each qubit type can have a respective range of frequency and anharmonicity; where frequency can be the energy difference between the lowest two energy states of a qubit, and anharmonicity can be the energy difference between the first and second transitions of the qubit.

In one or more embodiments, neighboring qubits (e.g., represented by nodes) can be assigned different frequencies; thus, neighboring qubits can be different qubit types. The qubit type component 114 can determine the number of qubit types that the tiling component 110 will be required to employ such that nearest neighboring qubits and next-nearest neighboring qubits are different qubit types. In various embodiments, nearest neighboring qubits can be qubits directly connected to each other on the lattice, and next-nearest neighboring qubits can be qubits connected to each other through one intermediate qubit on the lattice.

In various embodiments, the qubit type component 114 can determine the minimum number of qubit types to be employed by the tiling component 110 based on the Equation 1 below.

$$T = d + 1 \quad (1)$$

Where "T" can be the number of distinct qubit types assigned with regards to a given qubit, and "d" can be the number of nearest neighbor qubits of the given qubit in the lattice. For example, the process can be started by selecting an arbitrary qubit in the lattice with d nearest neighboring qubits and assigning d+1 distinct qubit types. Given the periodicity and primitive vectors of the lattice, the remaining qubits can be updated accordingly, and the procedure can be continued until the lattice is fully covered with minimum number of distinct qubits. In this way, for example, the qubit type component 114 can assign each qubit characterized by the lattice to one of the distinct qubit types such that nearest neighbor qubits and next-nearest neighbor qubits are assigned different qubit types. In various embodiments, the qubit type component 114 can analyze each qubit of the lattice in accordance with Equation 1. For example, where a qubit is represented by a degree 2 node 202 (e.g., having two nearest neighbor nodes 202), the qubit type component 114 can assign three distinct qubit types in association with the given node 202 (e.g., a first type for the represented qubit, a second type for one of the qubit's nearest neighbor qubits, and third type for the qubit's other nearest neighbor qubit). When assigning the qubit types, the qubit type component 114 can choose from a pool of qubit types previously assigned to one or more other qubits represented by the lattice. Where the pool of qubit types does not include a qubit type that can meet the characteristics described herein (e.g., where the pool of qubit types does not facilitate a qubit type assignment allocation such that the nearest and next-nearest neighbor qubits are different qubit types), the qubit type component 114 can generate a new qubit type to execute the qubit type assignments for the given qubit. Thereby, the qubit type component 114 can employ a minimum number of distinct qubit types to effectuate the qubit type assignment allocation. Further, the qubit type component 114 can analyze each qubit of the lattice in the same manner until each node 202 of the lattice is assigned a qubit type. For instance, where a lattice has a qubit at each vertex and comprises degree 2 and degree 3 vertices, the qubit type component 114 can determine that a minimum of 5 distinct qubit types can be employed in tiling the lattice with one or more CR gate configurations.

Figure 2:
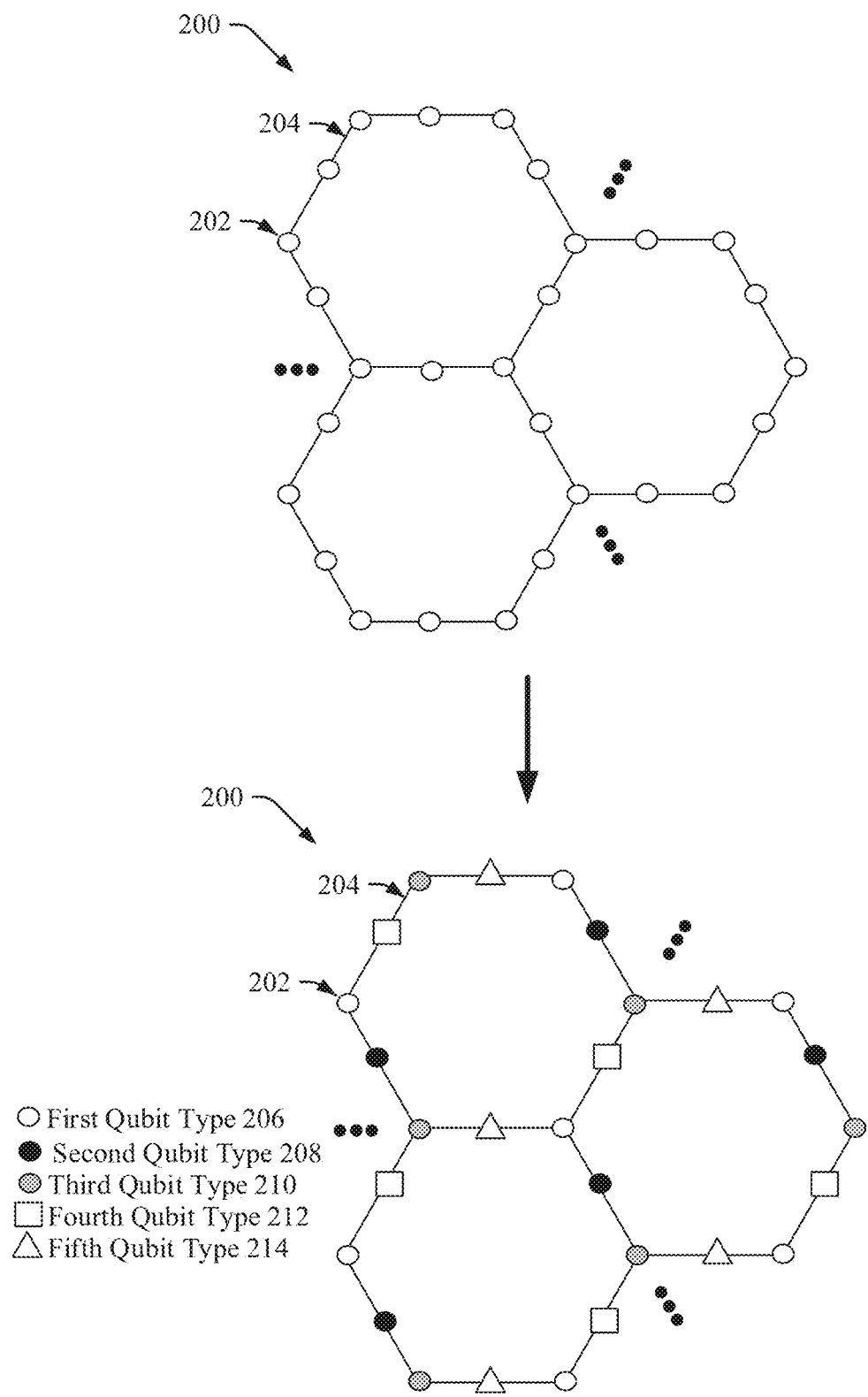
FIG. 2 illustrates a diagram of an example, non-limiting heavy-hexagon lattice that can characterize the topology of a quantum circuit in accordance with one or more embodiments described herein.

FIG. 2 illustrates a diagram of an example, non-limiting heavy-hexagon lattice 200 that can be tiled with one or more CR gate configurations by the tiling component 110 in accordance with one or more embodiments described herein. The top portion of FIG. 2 illustrates the exemplary lattice before tiling, and the bottom portion of FIG. 2 illustrates the lattice after exemplary qubit type assignments determined by the qubit type component 114. Repetitive description of like elements employed in other embodiments described herein is omitted for sake of brevity. The heavy-hexagon lattice 200 is depicted to exemplify the various feature of the one or more tiling operations that can be employed by the tiling component 110. However, the architecture of the lattices analyzed and/or tiled by the tiling component 110 is not limited to the architecture of heavy-hexagon lattice 200. For instance, lattice structures comprising other geometric shapes (e.g., in addition to, or alternative to, the hexagon shapes included in the heavy-hexagon lattice 200) are also envisaged. Example lattice structures that can be embodied by the one or more lattices analyzed and/or tiled by the tiling component 110 can include, but are not limited to: hexagon lattice structures (e.g., as exemplified by heavy-hexagon lattice 200), square lattice structures, triangular lattice structures, other polygonal structures, a combination thereof, and/or the like.

In various embodiments, the qubit type component 114 can analyze the given lattice (e.g., heavy-hexagon lattice 200) to determine the number of distinct qubit types to be employed in one or more CR gate configurations, such as described above, and/or thereby initiate one or more tiling operations by the tiling component 110. For example, the heavy-hexagon lattice 200 can be entered into the system 100 (e.g., via the one or more input devices 106), and can characterize the qubit connectivity of one or more quantum circuits. For instance, the heavy-hexagon lattice 200 can represent the number of qubits of the one or more quantum circuits and/or qubit connections that can be achieved by the one or more quantum circuits. In one or more embodiments, the hexagon lattice structures of the heavy-hexagon lattice 200 can enable qubit connectivity schemes that enhance quantum error correction for circuit architectures based on fixed-frequency superconducting qubits. FIG. 2 depicts a portion of the heavy-hexagon lattice 200. As delineated in FIG. 2 by the symbol "•••", the heavy-hexagon lattice 200 can further propagate in various directions.

As shown in FIG. 2, the heavy-hexagon lattice 200 can include a plurality of nodes 202, which can represent respective qubits. Further, the plurality of nodes 202 can be connected to each other via one or more lines 204, which can delineate qubit connections. In various embodiments, the qubit connections can be controlled via one or more CR gates. The qubit type component 114 can identify the qubits of the heavy-hexagon lattice 200 having the greatest number of nearest neighbor qubits (e.g., having the greatest amount of qubit connections). For instance, the heavy-hexagon lattice 200 can include degree 2 and degree 3 vertices. The qubit type component 114 can determine the amount of distinct qubit types to be employed by the tiling component 110 in accordance with Equation 1.

Also shown in FIG. 2, the qubit type component 114 can assign a qubit type to each of the nodes 202. For instance, where the qubit type component 114 determines a minimum of five distinct qubits types can be employed, each node 202 can be assigned to one of the five qubit types. Additionally, the qubit type component 114 can assign qubit types to the nodes 202 such that nearest and next-nearest neighbor nodes 202 have different qubit types. In FIG. 2, qubit type assignments are denoted by respective shading and/or crosshatching of each node 202. For example, each node 202 of the example heavy-hexagon lattice 200 is assigned to a first qubit type 206, a second qubit type 208, a third qubit type 210, a fourth qubit type 212, and/or a fifth qubit type 214.

For example, the example heavy-hexagon lattice 200 shown in FIG. 2 is an example lattice having 2 degree and 3 degree vertices. The qubit type component 114 can select an arbitrary node 202 to start the qubit type assignment process. Where the selected node 202 is a 2 degree vertex, the selected node 202 can have 2 nearest neighbor qubits (d=2). In accordance with Equation 1, the qubit type component 114 can determine that at least three distinct qubit types (d+1) can be assigned to facilitate qubit assignments associated with the selected node 202 (e.g., where the selected node 202 and the two nearest neighbor nodes 202 are each assigned a respective qubit type). For example, implementation of Equation 1 can ensure that nearest neighboring nodes 202 are not assigned the same qubit type. Thereby, the assignment component 114 can create a pool of qubit types comprising 3 distinct qubit types. Further, the assignment component 114 can select a next, unassigned node 202 for a qubit type assignment. The next node 202 selected for qubit type assignment can be arbitrarily selected from the heavy-hexagon lattice 200 and/or can be a node 202 connected to a previously assigned node 202.

Where the next selected node 202 is a 2 degree vertex, the qubit type component 114 can determine that 3 distinct qubit types can be assigned in association with the next selected node 202. Where a nearest neighbor node 202 is already assigned a qubit type, the qubit type component 114 can reassign the same qubit type to the given node 202 so as not to change previously established qubit type assignments. If the qubit type component 114 can assign the next selected node 202 and the unassigned nearest neighbor nodes 202 qubit types from the pool of qubit types while ensuring that next nearest neighboring qubits are assigned different qubit types, then the qubit type component 114 can assign three distinct qubit types in association with the next selected node 202 without adding a new qubit type to the pool of qubit types. If assignment of three qubit types from the pool of qubit types would result in one or more next nearest neighbor nodes 202 being assigned the same qubit type, then the qubit type component 114 can add a new qubit type to the pool of qubit types to facilitate the assignment of 3 distinct qubit types in association with the next selected node 202. Thereby, the total number of distinct qubit types assigned to the heavy-hexagon lattice 200 at this point in the assignment process can be 4.

Where the next selected node 202 is a 3 degree vertex, the qubit type component 114 can determine that 4 distinct qubit types can be assigned in association with the next selected node 202. If the pool of qubit types only comprises 3 distinct qubit types, the qubit type component 114 can add a fourth qubit type to the pool. Thereby, the qubit type component 114 can assign 4 distinct qubit types from the pool of qubit types to the next selected node 202 and its nearest neighbor nodes 202. Where a nearest neighbor node 202 is already assigned a qubit type, the qubit type component 114 can reassign the same qubit type to the given node 202 so as not to change previously established qubit type assignments. When assigning, the 4 distinct qubit types to the next selected node 202, the qubit type component 114 can further ensure that the nodes 202 are assigned distinct qubit types from their next nearest neighbor node 202.

In various embodiments, the qubit type component 114 can repeat the features discussed above to assign qubit types to all the nodes 202 of the heavy-hexagon lattice 200. For instance, the qubit type component 114 can repeatedly: select an unassigned node 202 for the qubit type assignment process; determine the number of qubit types to be assigned in association with the selected node 202 based on Equation 1; and assign qubit types from a pool of qubit types to the selected node 202 its nearest neighbor nodes 202, such that next nearest neighbor nodes 202 can be assigned distinct qubit types. Given the periodicity and the primitive vectors of the heavy-hexagon lattice 200, the qubit type component 114 can eventually select a node 202 in which fulfilling the qubit type assignment can include adding a fifth qubit type to the pool of qubit types in order to satisfy the criteria established by: Equation 1, and the next nearest neighbor nodes 202 being distinct qubit types. After expansion of the qubit pool to 5 distinct qubit types, the qubit assignment component 114 the subsequent qubit type assignments to the example heavy-hexagon lattice 200 can be performed by the qubit type component 114 in accordance with the features described above without increasing the size of the pool of qubit types beyond 5 distinct qubit types.

Figure 3:
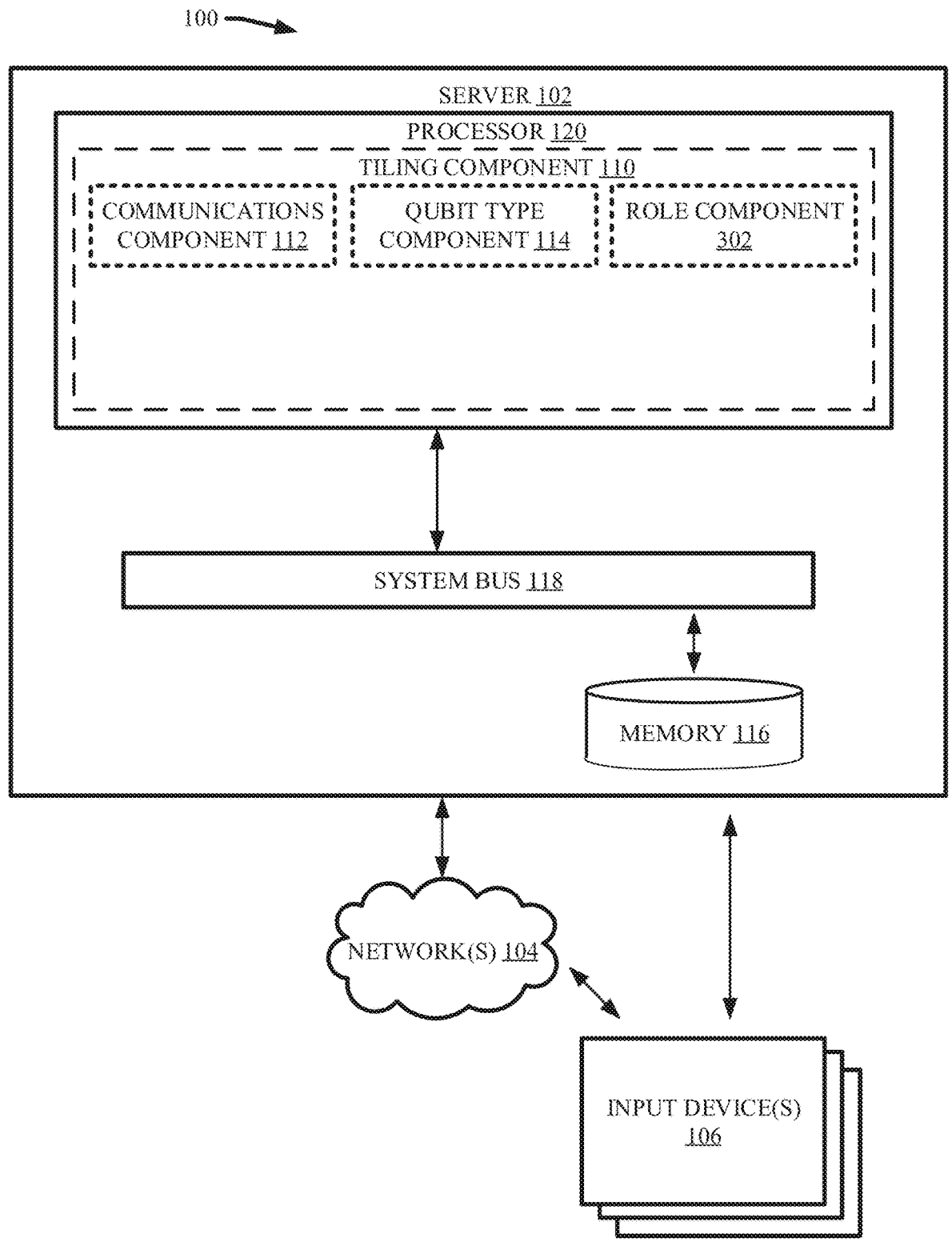
FIG. 3 illustrates a block diagram of an example, non-limiting system that can allocate control and/or target qubit roles to a plurality of qubits represented in a lattice that can characterize the topology of a quantum circuit in accordance with one or more embodiments described herein.

FIG. 3 illustrates a diagram of the example, non-limiting system 100 further comprising role component 302 in accordance with one or more embodiments described herein. Repetitive description of like elements employed in other embodiments described herein is omitted for sake of brevity. In various embodiments, the role component 302 can further assign control and target roles with regards to each qubit-qubit connection delineated by the one or more given lattices. For example, each pair of connected nodes 202 within the one or more given lattices can correspond to a respective CR gate. Thus, for each pair of connected nodes 202, the role component 302 can assign a control role and a target role.

For a given pair of connected nodes 202 (e.g., for a given connection 204), a node 202 can be assigned the control role and thereby represent a control qubit for the CR gate corresponding to the given pair. Additionally, another node 202 of the given pair of connected nodes 202, can be assigned the target role for the corresponding CR gate. For example, a given node 202 can be arbitrarily chosen by the role component 302 and assigned a control role, and one or more nearest neighbor nodes 202 can be assigned target roles. Additionally, a node 202 can be assigned the control role with regards to a first pairing involving the node 202, and the same node 202 can be assigned the target role with regards to a second pairing involving the node 202. Moreover, a node 202 can be assigned the control role or the target role with regards to multiple pairings involving the node 202. For example, a given node 202 can have multiple nearest neighbor nodes 202. Thus, the given node 202 can be a part of multiple different pairs of connected nodes 202. In various embodiments, the role component 302 can assign the given node 202 a first role with regards to a first pairing comprising the given node 202 and a first nearest neighbor node 202. Also, the role component 302 can assign the given node 202 a second role with regards to a second pairing comprising the given node 202 and a second nearest neighbor node 202. The first role and the second role can be same or different. For instance, the given node 202 can be assigned a control role with regards to the first pairing and a control role with regards to the second pairing. In another instance, the given node 202 can be assigned a control role with regards to the first pairing and a target role with regards to the second pairing.

Further, operation of CR gates can be enhanced with positive control qubit-target qubit detuning. Thus, the control-to-target direction (e.g., cross-resonance direction from the control qubit to the target qubit) can also determine the frequency span for the quantum circuit. In various embodiments, the role component 302 can assign control and/or target roles such that the control-to-target direction between paired nodes 202 (e.g., associated with a connection 204) can repeat one or more times within a sub-block of the lattice to span a wider frequency range and avoid frequency crowding. In some embodiments, the underlying quantum application to be executed by the quantum circuit can impose one or more restrictions on the repeating the control-to-target direction.

Figure 4:
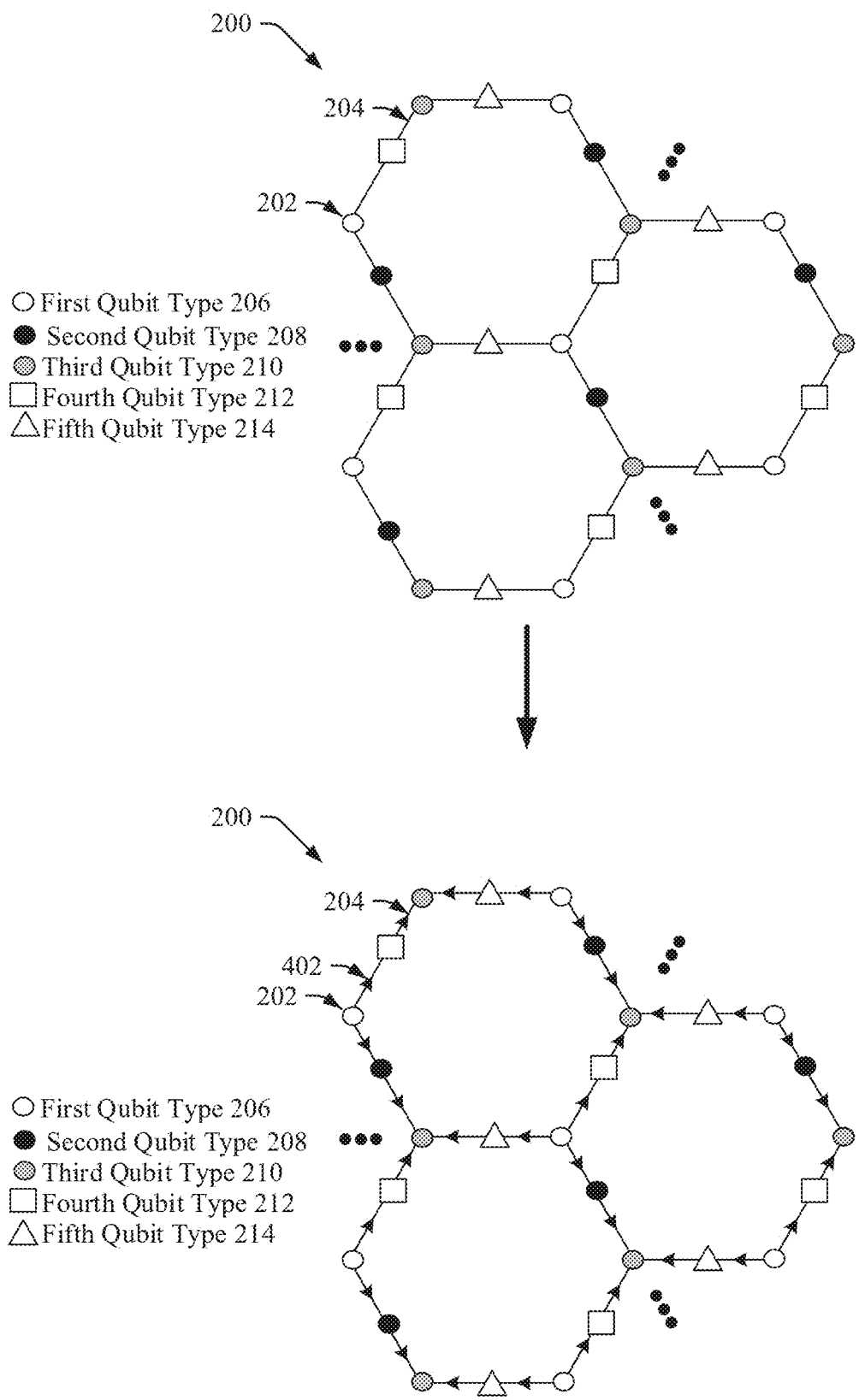
FIG. 4 illustrate a diagram of an example, non-limiting heavy-hexagon lattice modified to designate qubits types and/or qubit roles in a cross-resonance gate configuration in accordance with one or more embodiments described herein.

FIG. 4 illustrates a diagram of the example, non-limiting heavy-hexagon lattice 200 further comprising assigned control and/or target roles by the role component 302 in accordance with one or more embodiments described herein. Repetitive description of like elements employed in other embodiments described herein is omitted for sake of brevity. As shown in FIG. 4, the example heavy-hexagon lattice 200 in the top portion of FIG. 4 can be further modified by the role component 302 to assign control roles and/or target roles to the nodes 202 (e.g., and thereby the associate qubits) as shown in the bottom portion of FIG. 4.

In FIG. 4, the control-to-target direction for each pair of connected nodes 202 (e.g., for each CR gate operation) can be illustrated by an CR direction arrow 402. For each pair of nodes 202 directly connected in the heavy-hexagon lattice 200 (e.g., for each connection 204), the CR direction arrow 402 can originate from the node 202 assigned to the control role for the given pair and points to the node 202 assigned to the target role for the given pair. Further, the example heavy-hexagon lattice 200 can include sub-blocks of nodes 202 connected in a hexagon lattice structure. Within each hexagon sub-block, the role component 302 can assign control and/or target roles such that the control-to-target direction can repeat twice before changing direction.

To assign roles in one exemplary approach, for instance, the control-to-target direction can repeat on each edge of the hexagon sub-block, and the control-to-target direction can alternate at every other connection 204 to span a wider frequency range and avoid frequency crowding. For instance, in the exemplary role assignments generated by the role component 302 for the heavy-hexagon lattice 200 in FIG. 4: the first qubit type 206 can be assigned the control role in each instance in the heavy-hexagon lattice 200; the third qubit type 210 can be assigned the target role in each instance in the heavy-hexagon lattice 200; and the second qubit type 208, the fourth qubit type 212, and the fifth qubit type 214 can be assigned a control role with regards to a first connection 204 (e.g., with regards to a first CR gate) and a target role with regards to a second connection 204 (e.g., with regards to a second CR gate). In another example, the role component 302 can alternate the control-to-target direction with each adjacent CR gate. In a further example, the role component 302 can generate role assignments such that the control-to-target direction repeats consecutively more than twice. As described herein, the number of times the control-to-target direction repeats consecutively within a sub-block of the lattice can determine the frequency span for the quantum circuit. Different quantum algorithms can require different frequency spans; thus, the number of repeating consecutive control-to-target direction assignments generated by the role component 302 can depend on the underlying quantum algorithm. In various embodiments, the role component 302 can assign a minimum number of repeating consecutive control-to-target direction assignments to establish a frequency span that avoids frequency crowding for the quantum circuit and/or underlying quantum algorithm.

Figure 5:
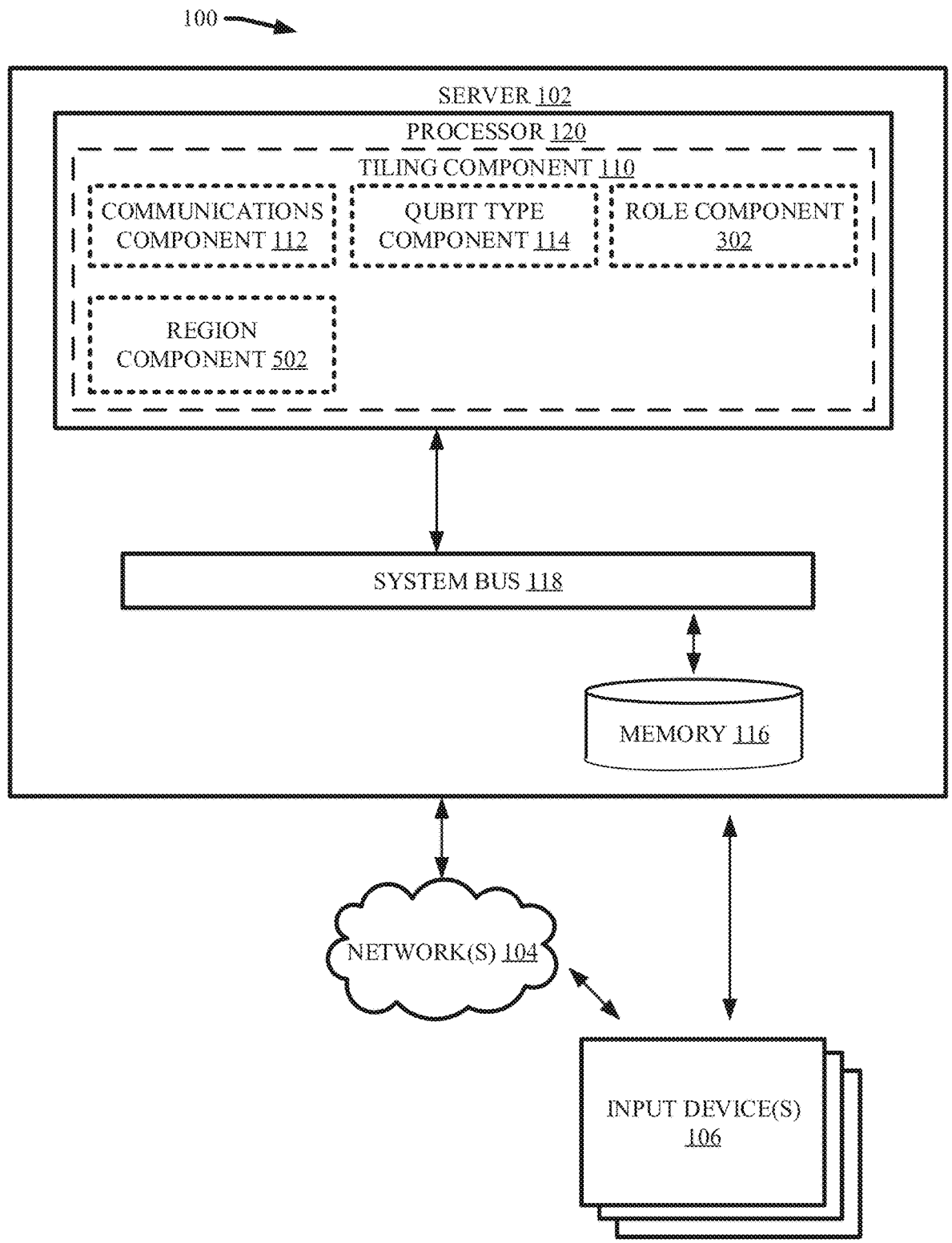
FIG. 5 illustrates a block diagram of an example, non-limiting system that can allocate operating regions for one or more cross-resonance gates of a cross-resonance gate configuration tiled to a lattice characterizing the topology of a quantum circuit in accordance with one or more embodiments described herein.

FIG. 5 illustrates a diagram of the example, non-limiting system 100 further comprising region component 502 in accordance with one or more embodiments described herein. Repetitive description of like elements employed in other embodiments described herein is omitted for sake of brevity. In various embodiments, the region component 502 can assign regions of operation to each qubit connection (e.g., each CR gate) characterized in the lattice.

For example, regions of operation can be assigned based on an amount of detuning between a control qubit and a target qubit. In various embodiments, the amount of control qubit-to-target qubit detuning ("$\Delta_{ct}$") for a CR gate can be characterized by Equation 2 below.

$$\Delta_{ct} = \omega_c - \omega_t \quad (2)$$

where "$\omega_c$" can be the frequency of the control qubit, and "$\omega_t$" can be the frequency of the target qubit. In examples, a given CR gate can be associated with five regions of operation based on the ratio of control qubit-to-target qubit detuning ("$\Delta_{ct}$") and the qubit anharmonicities ("$\alpha_{c,t}$") (e.g., where "$\alpha_c$" is the anharmonicity of the control qubit, and "$\alpha_t$" is the anharmonicity of the target qubit) where, e.g., the anharmonicity may be expressed in terms of numerical frequency. For instance, the five regions of operation can be defined by Equations 3-7 below.

$$\text{region I:} -\alpha_t < \Delta_{ct} < 0 \quad (3)$$

$$\text{region II:} 0 < \Delta_{ct} < -\frac{1}{2}\alpha_c \quad (4)$$

$$\text{region III:} -\frac{1}{2}\alpha_c < \Delta_{ct} < -\alpha_c \quad (5)$$

$$\text{region IV:} -\alpha_c < \Delta_{ct} < -\frac{3}{2}\alpha_c \quad (6)$$

$$\text{region V:} -\frac{3}{2}\alpha_c < \Delta_{ct} < -2\alpha_c \quad (7)$$

Figure 6:
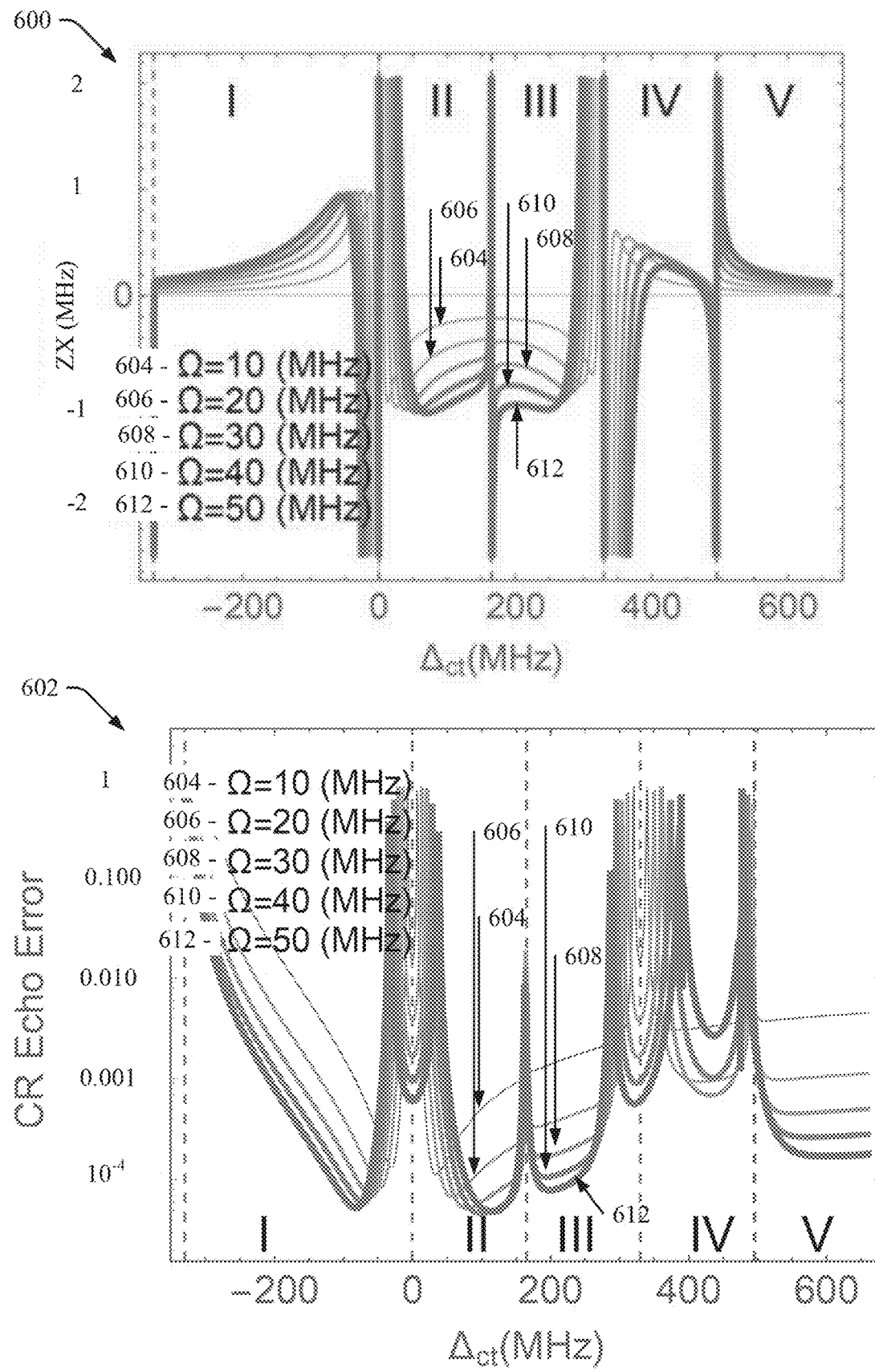
FIG. 6 illustrates diagrams of example, non-limiting graphs that can demonstrate five regions of operation available to one or more cross-resonance gates of a cross-resonance gate configuration tiled to a lattice characterizing the topology of a quantum circuit in accordance with one or more embodiments described herein.

FIG. 6 illustrates diagrams of example, non-limiting graphs 600, 602 that can demonstrate CR gate operation within region I, region II, region III, region IV, and/or region V in accordance with one or more embodiments described herein. Repetitive description of like elements employed in other embodiments described herein is omitted for sake of brevity. Graph 600 can depict CR gate operation with regards to the ZX rate, and graph 602 can depict CR gate operation with regards to coherent error.

In FIG. 6, roman numeral "I" delineates the position of region I, roman numeral "II", delineates the position of region II, roman numeral "III" delineates the position of region III, roman numeral "IV" delineates the position of region IV, and/or roman numeral "V" delineates the position of region V. To generate graphs 600 and/or 602, the qubit-qubit exchange interaction ("J") was 2 megahertz (MHz) with varying control qubit-to-target qubit detuning ("$\Delta_{ct}$") and cross-resonance drive amplitudes ("$\Omega$"). For example, line 604 represents CR gate operation at a drive amplitude of 10 MHz, line 606 represents CR gate operation at a drive amplitude of 20 MHz, line 608 represents CR gate operation at a drive amplitude of 30 MHz, line 610 represents CR gate operation at a drive amplitude of 40 MHz, and/or line 612 represents CR gate operation at a drive amplitude of 50 MHz. As shown in graph 600, the ZX rate can be maximized when the control qubit-to-target qubit detuning ("$\Delta_{ct}$") is close to region II and/or region III. As a result, regions II and III may be viewed as preferred in this example. As shown in graph 602, the middle of region I, region II, and/or region II can provide detuning values for minimal coherent error, while the optimal interval in region I is narrower compared to region II and/or region III.

Referring again to FIG. 5, the region component 502 can assign an operating region to each of the qubit connections (e.g., each of the CR gates) characterized by the given lattice. For example, the region component 502 can assign optimal regions of operation to each CR gate qubit pair to enhance (e.g., maximize) the ZX rate and/or reduce (e.g., minimize) coherent error. For instance, as exemplified by graphs 600 and/or 602, the region component 502 can assign CR gates to region I, region II, and/or region III of operation. In one or more embodiments, the region component 502 can assign CR gates to region II and/or region III due to at least the wide optimal control qubit-to-target qubit detuning ("$\Delta_{ct}$") available. In various embodiments, the region component 502 can alternate the assigned operating region of adjacent CR gates, where possible, to reduce the possibility of resonance collisions. For example, the region component 502 can select a given qubit connection and assign region II or region III of operation. Where the region component 502 selects region II of operation for the given qubit connection, the region component 502 can assign one or more nearest neighboring qubit connects region III of operation. Where the region component 502 selects region III of operation for the given qubit connection, the region component 502 can assign one or more nearest neighboring qubit connects region II of operation.

Figure 7:
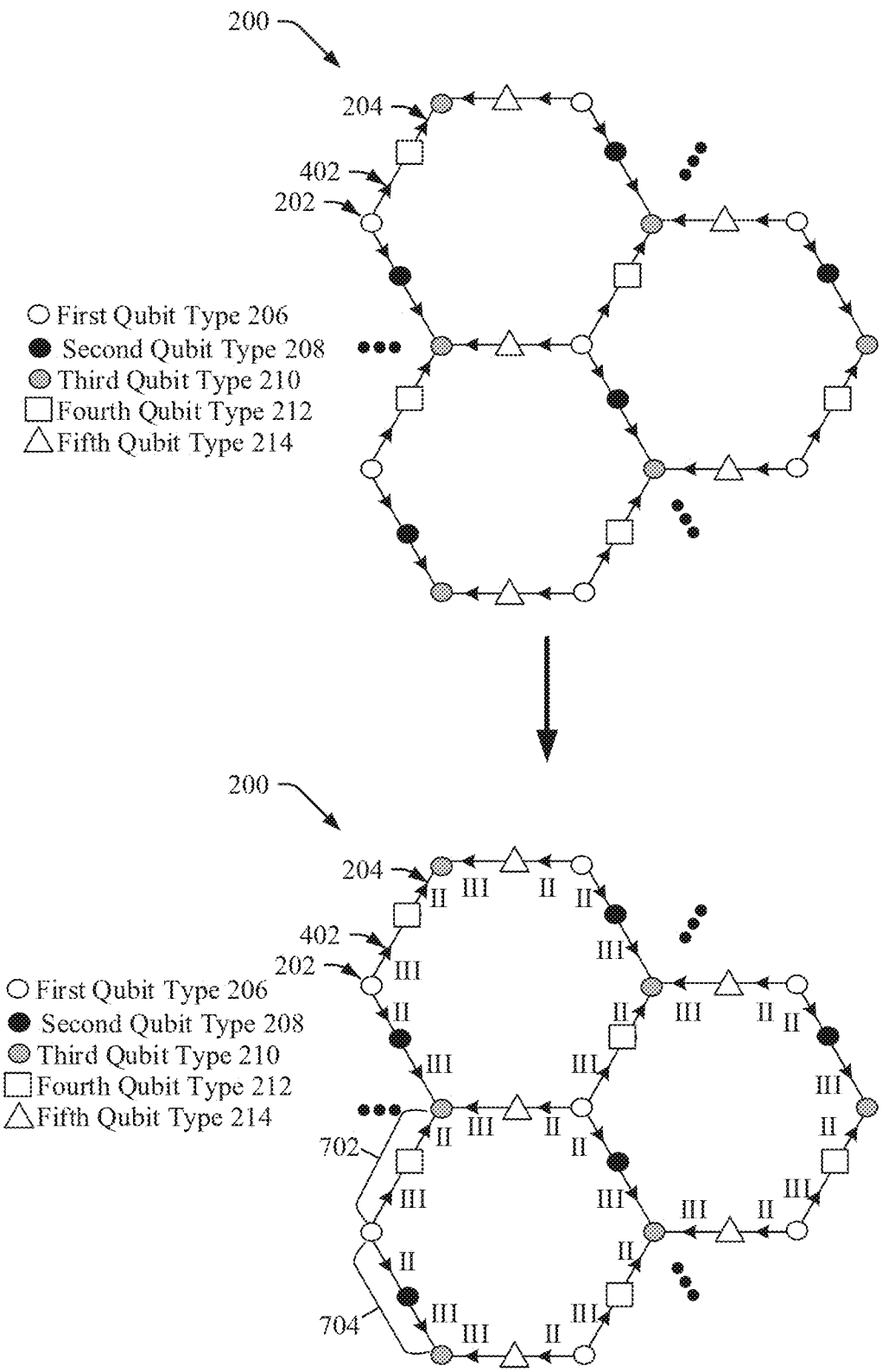
FIG. 7 illustrate a diagram of an example, non-limiting heavy-hexagon lattice modified to designate cross-resonance gate operation regions in a cross-resonance gate configuration in accordance with one or more embodiments described herein.

FIG. 7 illustrates a diagram of the example, non-limiting heavy-hexagon lattice 200 further comprising assigned operating regions by the region component 502 in accordance with one or more embodiments described herein. Repetitive description of like elements employed in other embodiments described herein is omitted for sake of brevity. As shown in FIG. 7, the example heavy-hexagon lattice 200 can be further modified by the region component 502 to assign operating regions to each pair of connected nodes 202 (e.g., and thereby the assign operating regions to associate CR gates).

As shown in FIG. 7, the region component 502 can implement an exemplary region assignment scheme with regards to the heavy-hexagon lattice 200 shown in the top portion of FIG. 7 in which pairwise detuning values from region II and/or region III are assigned to optimize gate speed and/or coherent error as shown in the bottom portion of FIG. 7. In this regard, for example, region component 502 can begin by assigning alternate regions to adjacent qubit connections of a given edge of the lattice, and then assign regions to qubit connections of adjacent edges based on the sum of the detuning amounts of the given edge. Thus, in an example, each edge of the heavy-hexagon lattice 200, the region component 502 can alternate between region II assignments and/or region III assignments for the node 202 pairings. In one or more embodiments, the region component 502 can assign operating regions such that the sum of control qubit-to-target qubit detuning ("$\Delta_{ct}$") values add to zero based on the periodicity of the lattice and/or the number of distinct qubit types. For example, with regards to the heavy-hexagon lattice 200, the region component 502 can assign operating regions such that the sum of control qubit-to-target qubit detuning ("$\Delta_{ct}$") values of a given edge of the lattice structure is equal to the sum of control qubit-to-target qubit detuning ("$\Delta_{ct}$") values of an adjacent edge.

For instance, with regards to the heavy-hexagon lattice 200 exemplified in FIG. 7, qubits of the first qubit type 206 can be assigned the control role (e.g., via the role component 302) with regards to a pairing with qubits of the fourth qubit type 212 and with regards to a pairing with qubits of the second qubit type 208. Qubits of the fourth qubit type 212 can be assigned the target role (e.g., via the role component 302) with regards to the pairing with the qubits of the first qubit type 206. Further, qubits of the fourth qubit type 212 can also be a part of pairings with qubits of the third qubit type 210, in which the qubits of the fourth qubit type 212 can be assigned the control role (e.g., via the role component 302). Additionally, the qubits of the third qubit type 210 can be assigned the target role (e.g., via the role component 302) with regards to the pairing with the qubits of the fourth qubit type 212. Also, qubits of the second qubit type 208 can be assigned the target role (e.g., via the role component 302) with regards to the pairing with the qubits of the first qubit type 206. Further, qubits of the second qubit type 208 can also be a part of pairings with qubits of the third qubit type 210, in which the qubits of the second qubit type 208 can be assigned the control role (e.g., via the role component 302). Additionally, the qubits of the third qubit type 210 can be assigned the target role (e.g., via the role component 302) with regards to the pairing with qubits of the second qubit type 208.

The pairings of the qubits of the first qubit type 206 and qubits of the second qubit type 208 can have a control qubit-to-target qubit detuning ("$\Delta_{12}$") within the region II of operation. The pairings of the qubits of the second qubit type 208 and qubits of the third qubit type 210 can have a control qubit-to-target qubit detuning ("$\Delta_{23}$") within the region III of operation. Thereby, a first edge 702 of the heavy-hexagon lattice having a connection 204 of qubits of the first qubit type 206 with qubits of the second qubit type 208 and another connection 204 of qubits of the second qubit type 208 with qubits of the first qubit type 206 can have a total detuning characterized by: $\Delta_{12}+\Delta_{23}$.

Likewise, the pairings of the qubits of the first qubit type 206 and qubits of the fourth qubit type 212 can have a control qubit-to-target qubit detuning ("$\Delta_{14}$") within the region III of operation. The pairings of the qubits of the fourth qubit type 212 and qubits of the third qubit type 210 can have a control qubit-to-target qubit detuning ("$\Delta_{43}$") within the region II of operation. Thereby, a second edge 704 of the heavy-hexagon lattice having a first node 202 pairing of qubits of the first qubit type 206 with qubits of the fourth qubit type 212 and a second node 202 pairing of qubits of the fourth qubit type 212 with qubits of the third qubit type 210 can have a total detuning characterized by: $\Delta_{14}+\Delta_{43}$. As shown in FIG. 7, the first edge 702 and the second edge 704 can be adjacent to each other throughout the heavy-hexagon lattice 200, and the adjacent detuning values can be characterized by: $\Delta_{12}+\Delta_{23}=\Delta_{14}+\Delta_{43}$.

Figure 8:
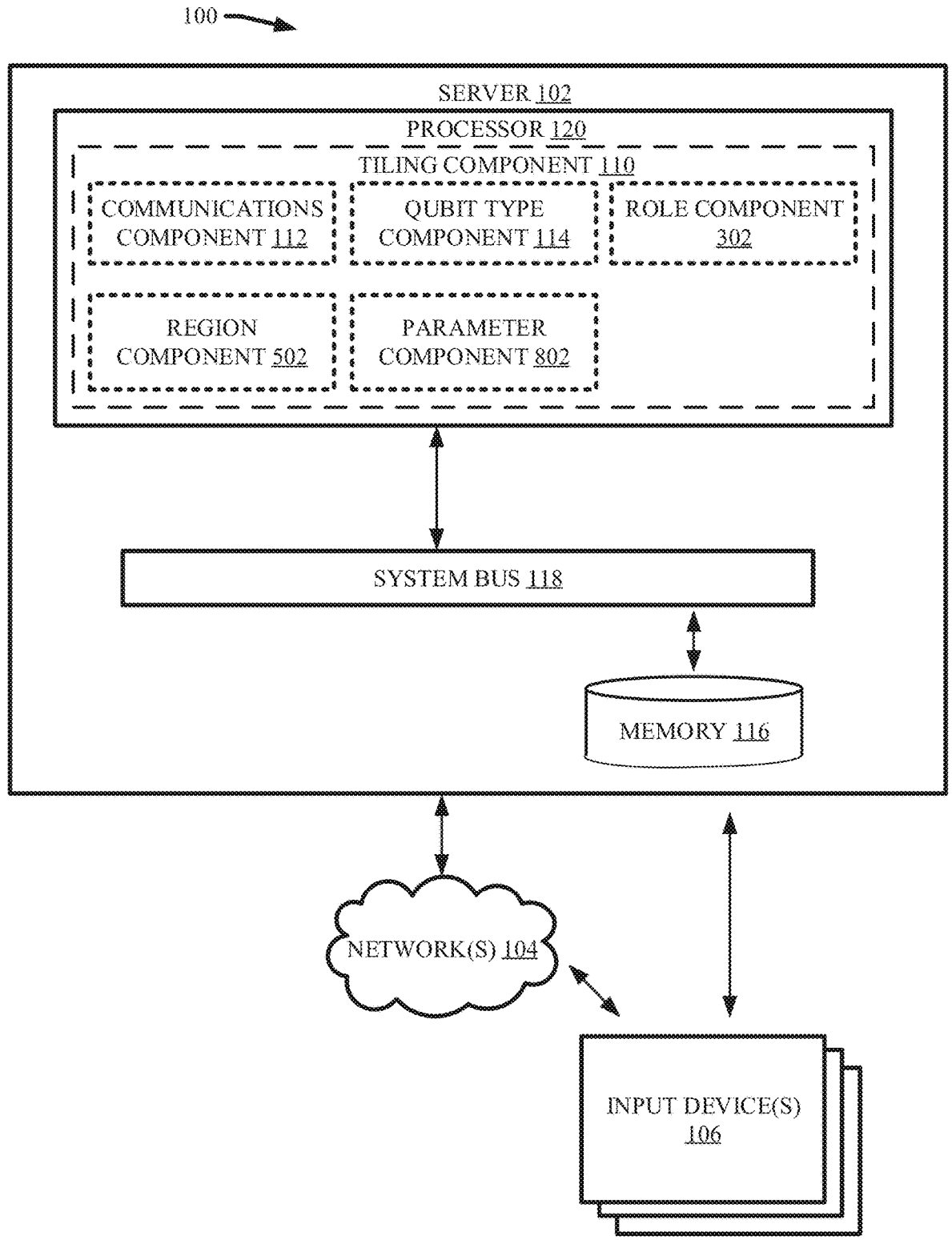
FIG. 8 illustrates a block diagram of an example, non-limiting system that can allocate frequency parameters for one or more cross-resonance gates of a cross-resonance gate configuration tiled to a lattice characterizing the topology of a quantum circuit in accordance with one or more embodiments described herein.

FIG. 8 illustrates a diagram of the example, non-limiting system 100 further comprising parameter component 802 in accordance with one or more embodiments described herein. In various embodiments, the parameter component 802 can assign initial CR gate parameters to the qubit connections characterized by the one or more unput lattices. For example, the parameter component 802 can assign detuning values (e.g., control qubit-to-target detuning values ("$\Delta_{ct}$") and/or spectator connection detuning values) for each of the qubit connections (e.g., each of the CR gates) and anharmonicity values for each of the respective qubits characterized by the lattice.

In various embodiments, the parameter component 802 can set the control qubit-to-target detuning ("$\Delta_{ct}$") of each cross-resonance qubit pair based on the local minima of coherent error (e.g., as depicted in graph 602) in the assigned region of operation. For instance, the control qubit-to-target detuning ("$\Delta_{ct}$") corresponding with region I, region II, and/or region III can be characterized by Equations 8-10 below.

$$\text{region I:} \Delta_{ct} \approx 0.30\alpha_c \tag{8}$$

$$\text{region II:} \Delta_{ct} \approx -0.30\alpha_c \tag{9}$$

$$\text{reigion III:} \Delta_{ct} \approx -0.60\alpha_c \tag{10}$$

Further, the parameter component 802 can set the qubit-qubit exchange interaction value ("J") can be set such that the ZZ rate of the CR gates sit below a defined threshold. In one or more embodiments, the defined threshold can be set via the one or more input devices 106. For example, the defined threshold can range from greater than or equal to 5 and less than or equal to 20 MHz (e.g., with regards to a qubit-qubit exchange interaction ("J") of 2 MHz). The defined threshold can be derived from the physics of each collision and can depend on multiple factors, such as the qubit-qubit exchange interaction ("J") and/or the type of collision. In one or more embodiments, one or more of the frequency assignments can be at least 50 MHz away from the collisions. In various embodiments, one or more frequency assignments can be at least 20 MHz away from near collision cases.

Figure 9:
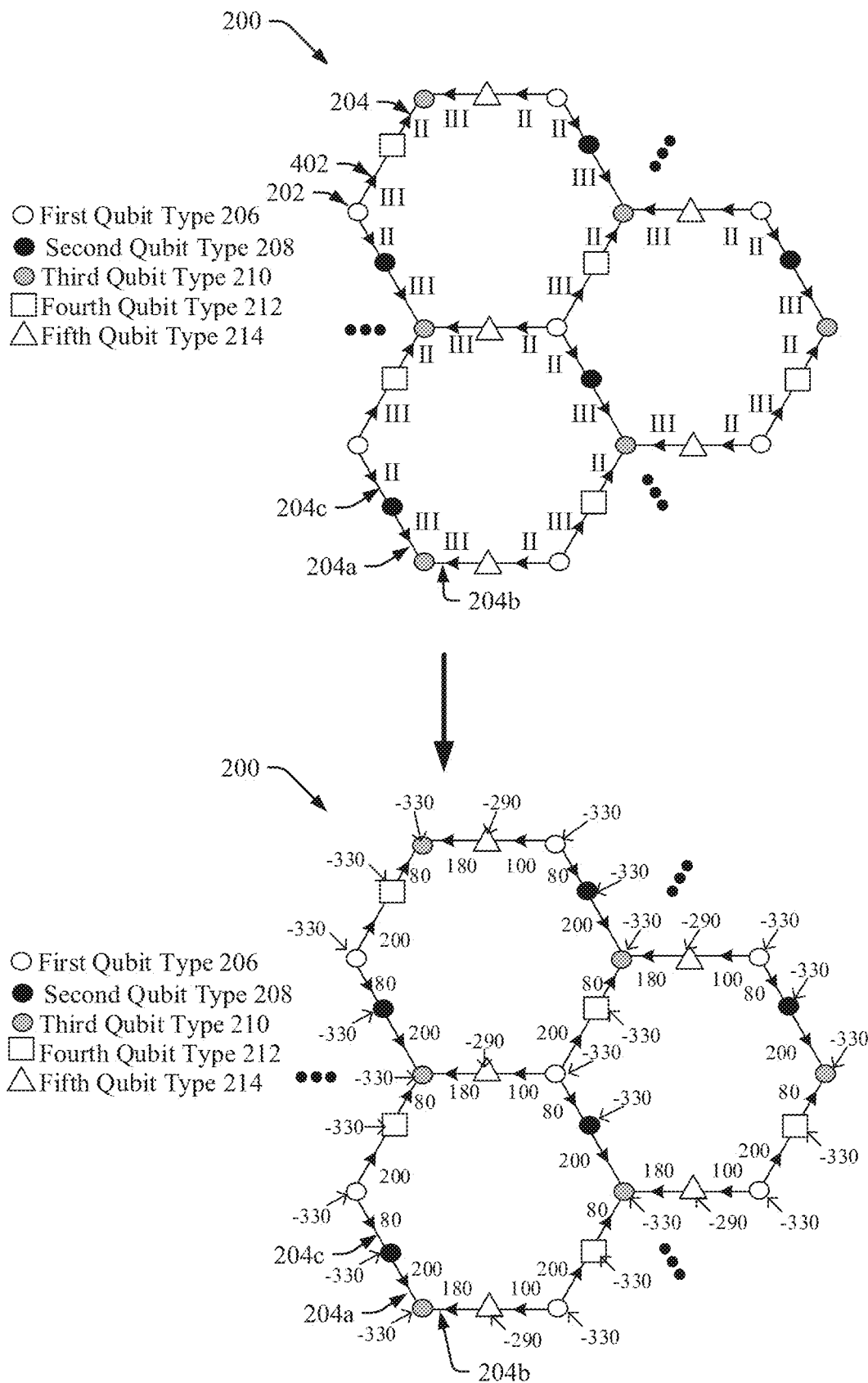
FIG. 9 illustrate a diagram of an example, non-limiting heavy-hexagon lattice modified to designate detuning values and/or anharmonicity values in a cross-resonance gate configuration in accordance with one or more embodiments described herein.

FIG. 9 illustrates a diagram of the example, non-limiting heavy-hexagon lattice 200 shown in the top portion of FIG. 9 further comprising CR gate parameters initially assigned by the parameter component 802 shown in the bottom portion of FIG. 9 in accordance with one or more embodiments described herein. Repetitive description of like elements employed in other embodiments described herein is omitted for sake of brevity. As shown in FIG. 9, each connection 204 between nodes 202 (e.g., each qubit-qubit connection, and thereby each CR gate) can be assigned a control qubit-to-target detuning ("$\Delta_{ct}$") value by the parameter component 802. Additionally, each node 202 (e.g., thereby each qubit) can be assigned an anharmonicity value by the parameter component 802.

In FIG. 9 the assigned detuning values (e.g., control qubit-to-target detuning ("$\Delta_{ct}$") values) are shown adjacent to the CR direction arrow 402 for the associate connection 204 (e.g., associate CR gate). Additionally, in FIG. 9 the assigned anharmonicity values are shown adjacent to the associate nodes 202 (e.g., thereby delineating the anharmonicity values for the represented qubits). Further, the detuning value of a given connection 204 can be a control qubit-to-target qubit detuning ("$\Delta_{ct}$") value with regards to the given connection 204 and/or a spectator qubit detuning value with regards to one or more nearest neighboring connections 204 on the lattice. The detuning values (e.g., control qubit-to-target detuning ("$\Delta_{ct}$") values and/or spectator qubit detuning values) and/or the anharmonicity values depicted in FIG. 9 are in MHz.

As shown in FIG. 9, connections 204 assigned to region III operation (e.g., by the region component 502) can be assigned a detuning value from within the range associated with region III in graphs 600 and/or 602. For example, connections 204 assigned to region III operation (e.g., by the region component 502) can be assigned a detuning value of 200 or 180 MHz in the exemplary heavy-hexagon lattice 200 shown in FIG. 9. Likewise, connections 204 assigned to region II operation (e.g., by the region component 502) can be assigned a detuning value from within the range associated with region II in graphs 600 and/or 602. For example, connections 204 assigned to region II operation (e.g., by the region component 502) can be assigned a detuning value of 80 or 100 MHz in the exemplary heavy-hexagon lattice 200 shown in FIG. 9.

Where a node 202 is involved in multiple connections 204 assigned to the same region of operation, the parameter component 802 can assign different detuning values (e.g., control qubit-to-target detuning ("$\Delta_{ct}$") values from the assigned region to the respective connections 204. For example, the first exemplary connection 204a (e.g., representing a CR gate) and the second exemplary connection 204b (e.g., representing another CR gate) shown in FIG. 9 can be nearest neighboring connections 204 involving a common node 202 and a common region assignment (e.g., a region III assignment). The parameter component 802 can assign a control qubit-to-target detuning ("$\Delta_{ct}$") value of 200 MHz to the first exemplary connection 204a and a control qubit-to-target detuning ("$\Delta_{ct}$") value of 180 MHZ to the second exemplary connection 204b.

In various embodiments, the parameter component 802 can assign detuning values such that a difference between the detuning values of nearest neighboring connections 204 in the lattice (e.g., heavy-hexagon lattice 200) can be greater than or equal to a defined threshold. For instance, for a given connection 204, the spectator qubit detuning value (e.g., the control qubit-to-target detuning ("$\Delta_{ct}$") value assigned to a nearest neighboring connection 204) can differ from the control qubit-to-target detuning ("$\Delta_{ct}$") value (e.g., the detuning value assigned to the given connection 204) by at least the defined threshold. For example, the detuning value of the third exemplary connection 204c shown in FIG. 9 can be a spectator qubit detuning value with respect to the first exemplary connection 204a (e.g., whereas the same detuning value can be considered a control qubit-to-target detuning ("$\Delta_{ct}$") value with respect to the third exemplary connection 204c) and can differ from the control qubit-to-target detuning ("$\Delta_{ct}$") value assigned to the first exemplary connection 204a by at least the defined threshold.

FIG. 9 depicts an exemplary embodiment in which the defined threshold is 20 MHz. For example, the detuning values assigned to nearest neighboring connections 204 differ by at least 20 MHz. For instance, the first exemplary connection 204a and the second exemplary connection 204b are both assigned to region III operation and are assigned respective detuning values that differ by at least 20 MHz. The third exemplary connection 204c is assigned to region II operation and can thereby be assigned a detuning value that differs from the first exemplary connection 204a by even more than 20 MHz (e.g., by 120 MHz). By defining distinct detuning values between nearest neighboring connections 204 that vary by at least the defined threshold, the tiling component 110 can reduce (e.g., minimize) resonance collisions (e.g., caused by spectator qubits). More generally in this regard, for example, the parameter component 802 can begin by setting the detuning values to the local minima of coherent error in the assigned region of operation. For instance, graph 602 illustrates that the local minima of coherent error for region II can be associated with the control qubit-to-target detuning ("$\Delta_{ct}$") value of about 100 MHz, and the local minima of coherent error for region III can be associated with the control qubit-to-target detuning ("$\Delta_{ct}$") value of about 200 MHz. Then the parameter component 802 can adjust the control qubit-to-target detuning ("$\Delta_{ct}$") value of adjacent CR gates assigned to the same region of operation. For instance, the parameter component 802 can increase or decrease the detuning value of one and/or both of the adjacent CR gates to achieve a difference that is greater than or equal to the defined threshold while still defining detuning values within the range of detuning values associated with the assigned region of operation (e.g., as shown in FIG. 6). Subsequently, the tiling component 110 can simulate operation of the tiled lattice configuration to identify frequency collisions involving nearest neighboring qubits, whereupon the parameter component 802 can further adjust the detuning values associated with the nearest neighbor collisions by incrementally increasing or decreasing (e.g., by a defined increment value) the associate detuning value and re-simulating the operation until a collision-free solution is found.

Additionally, the parameter component 802 can assign anharmonicity values to each of the nodes 202 of the heavy-hexagon lattice 200. In various embodiments, the plurality of anharmonicity values can be equivalent, or substantially equivalent. For example, in the exemplary heavy-hexagon lattice 200, the parameter component 802 can assign an anharmonicity value of −330 MHz for the qubits of the first qubit type 206, the second qubit type 208, the third qubit type 210, and/or the fourth qubit type 212. For instance, an anharmonicity value of −330 MHz can achieve the local minima of coherent error associated with region II and/or III based on, for example, graph 602 and/or Equations 9-10. In various embodiments, one or more of the anharmonicity values can differ from each other. For example, in the exemplary heavy-hexagon lattice 200, the parameter component 802 can assign an anharmonicity value of −290 MHz for the qubits of the fifth qubit type 214. For instance, the anharmonicity value assignments shown in FIG. 9 can improve error operation between CR gates involving qubits of the fifth qubit type and qubits of the third qubit type (e.g., as opposed to an embodiment in which the qubits of the fifth qubit type 214 and the third qubit type 210 have the same anharmonicity value). More generally in this regard, for example, the parameter component can begin by determining the anharmonicity values based on the initial detuning values in accordance with Equations 9-10. For instance, an anharmonicity value of about −330 MHz can achieve the initially defined detuning value of about 200 for region III and/or about 100 MHz for region II. Further, the parameter component 802 can adjust the anharmonicity value along with the one or more detuning values based on the simulated operations performed by the tiling component 110 to determine a collision-free tiling configuration.

Figure 10:
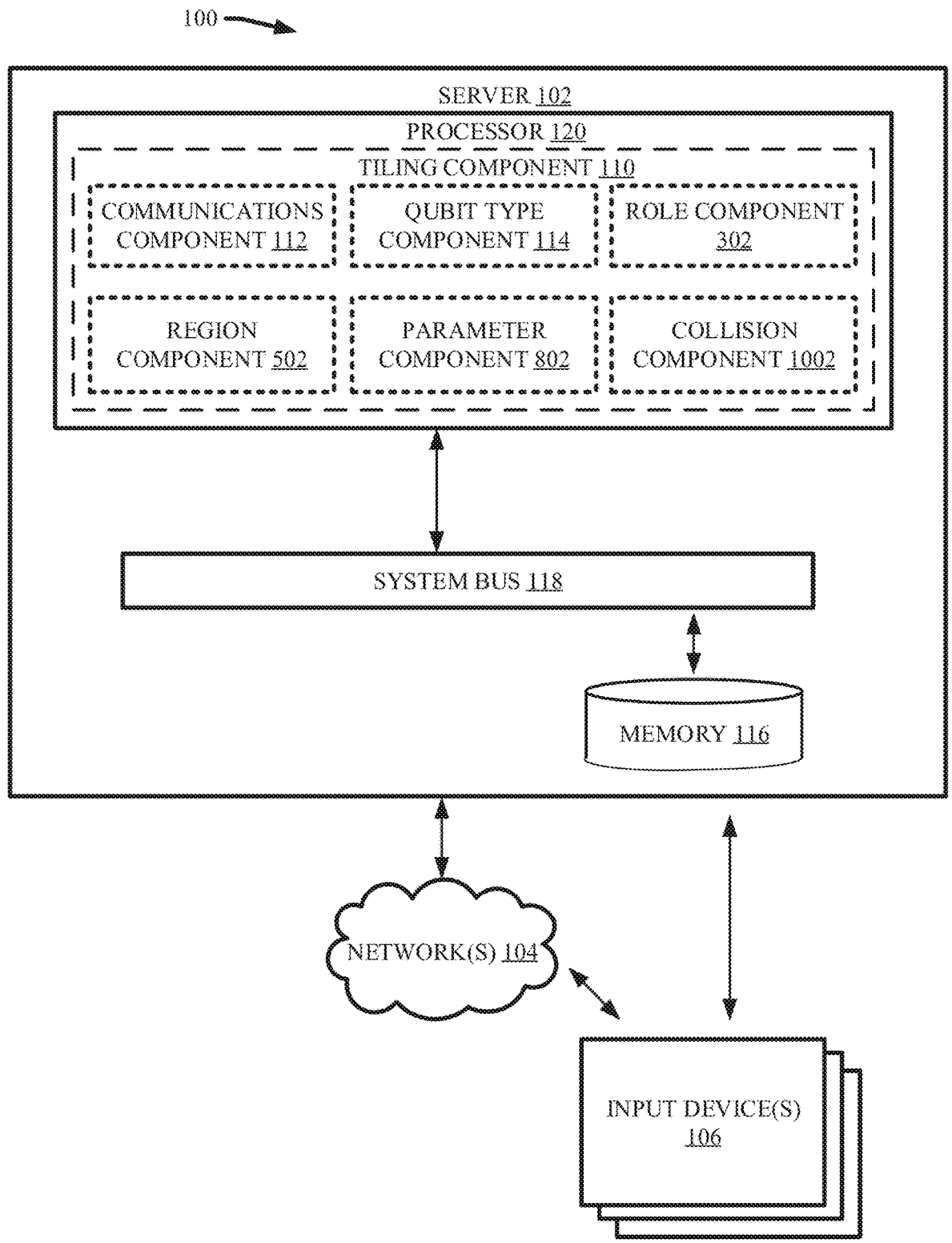
FIG. 10 illustrates a block diagram of an example, non-limiting system that can identify and/or resolve one or more resonance collisions of one or more cross-resonance gates of a cross-resonance gate configuration tiled to a lattice characterizing the topology of a quantum circuit in accordance with one or more embodiments described herein.

FIG. 10 illustrates a diagram of the example, non-limiting system 100 further comprising collision component 1002. Repetitive description of like elements employed in other embodiments described herein is omitted for sake of brevity. In various embodiments, the collision component 1002 can resolve instances of resonance collisions between configured CR gates.

In one or more embodiments, operation of the quantum circuit configured by the associate components of the tiling component 110 (e.g., qubit type component 114, role component 302, region component 502, and parameter component 802) can be analyzed by the collision component 1002 to identify and/or resolve one or more occurrences of resonance collision between qubits. In various embodiments, collisions that involve nearest neighbor qubits can be stronger than collisions involving next-nearest qubits in the lattice, and thereby can result in wider collision peaks. The collision component 1002 can set one or more tolerance values association with each type of collision (e.g., the one or more tolerances can be defined via the one or more input devices 106). Given the tolerance values, the collision component 1002 can compare the frequency allocation set by the parameter component 802 against a list of possible frequency collisions. Where one or more of the frequencies allocated by the parameter component 802 match one or more possible frequency collisions, the collision component 1002 can adjust the qubit frequencies (e.g., the detuning values) and/or anharmonicity values of the qubits until a collision-free configuration is reached.

In various embodiments, the collision component 1002 can perform one or more additional numerical and/or perturbative analyses regarding connections 204 that are close to one or more spectator collisions (e.g., resonance collisions involving a spectator qubit). For example, the collision component 1002 can employ one or more spectator collision thresholds (e.g., defined by via the one or more input devices 106). Where there is a modification to the CR gate due to a spectator qubit, the collision component 1002 can compare the observed CR gate operation (e.g., operation influenced by the spectator qubit) to ideal operation of the CR gate (e.g., operation absent the spectator qubit influence). For example, the collision component 1002 can determine the difference between the observed CR gate operation and the ideal CR gate operation for all potential collisions across the lattice. If a difference between the observed CR gate operation and the ideal CR gate operation is below the defined threshold, the collision component 1002 accepts the frequency allocation initially set by the parameter component 802. If the difference between the observed CR gate operation and the ideal CR gate operation is greater than the defined threshold, the collision component 1002 can instruct the parameter component 802 to allocate different frequency values (e.g., alternate detuning values and/or anharmonicity values) to the given CR gate; whereupon the collision component 1002 can reevaluate the CR gate operation to determine whether further tuning of the frequency values (e.g., via parameter component 802) is required to meet the defined threshold.

FIG. 11 illustrates a diagram of example, non-limiting tables 1102, 1104, and/or 1106 that demonstrate exemplary operation of the CR gate configuration shown in FIG. 9 on the heavy-hexagon lattice 200 in accordance with one or more embodiments described herein. Repetitive description of like elements employed in other embodiments described herein is omitted for sake of brevity. Table 1102 regards CR gate operation of the exemplary CR gate configuration achieved on the heavy-hexagon lattice 200 and shown in FIG. 9. Table 1104 depicts operation between control qubits and spectator qubit of the exemplary CR gate configuration achieved on the heavy-hexagon lattice 200 and shown in FIG. 9. Table 1106 depicts operation between target qubits and spectator qubit of the exemplary CR gate configuration achieved on the heavy-hexagon lattice 200 and shown in FIG. 9. In various embodiments, tables 1102, 1104, and/or 1106 can be generated and/or populated by the collision component 1002.

In table 1102, the "CR specifications" row can delineate the type of CR gates included in the exemplary CR gate configuration achieved on the heavy-hexagon lattice 200 and shown in FIG. 9. For instance, qubits of the first qubit type 206 are represented by "$Q_1$", qubits of the second qubit type 208 are represented by "$Q_2$", qubits of the third qubit type 210 are represented by "$Q_3$", qubits of the fourth qubit type 212 are represented by "$Q_4$", and/or qubits of the fifth qubit type are represented by "$Q_5$". Further, the arrows shown in Table 1102 represent the CR direction arrows 402 for the given CR gate. For example, "$Q_1 \rightarrow Q_2$" represents one or more CR gates involving qubits of the first qubit type 206 as the control qubits and qubits of the second qubit type 208 as the target qubits. Additionally, "IX", "IZ", "ZI", "ZX" are respective types of gate rates with regards to the associate CR gate types. As shown in table 1102, where the CR gate configuration employs a qubit exchange interaction ("J") of 2 MHz, the ZZ rate of the CR gates can range approximately between 12 to 40 kilohertz (KHz), and the quantum circuit can achieve a coherent error of approximately 10-4 for all six distinct CR gate types.

In table 1104, the "Control-spectator" row can delineate various spectator qubit connections that can be employed with the types of CR gates described in table 1102. In the "Control-spectator" row, the spectator qubit type can be presented below the associate CR gate. For example, the first example configuration 1108 can involve qubits of the fourth qubit type 212 serving as spectator qubits connected to the control qubit (e.g., qubits of the first qubit type 206) of the CR gate between qubits of the first qubit type 206 and qubits of the second qubit type 208. Additionally, "$\Delta_{st}$" can be spectator qubit-to-target qubit detuning value, and "$\alpha_s$" can be the anharmonicity of the spectator qubit. In various embodiments, configurations with a 20-30 MHz interval can be considered by the collision component 1002 to be near-collisions (e.g., such as the configurations labeled via points "a", "b", "c", and/or "d"). However, table 1104 demonstrates that renormalization of the near-collision CR gates due to such spectator collision can be found acceptable by the collision component 1002.

In table 1106, the "Target-spectator" row can delineate various spectator qubit connections that can be employed with the types of CR gates described in table 1102. In the "Target-spectator" row, the spectator qubit type can be presented below the associate CR gate. For example, the second example configuration 1110 can involve qubits of the third qubit type 210 serving as spectator qubits connected to the target qubit (e.g., qubits of the second qubit type 208) of the CR gate between qubits of the first qubit type 206 and qubits of the second qubit type 208. In various embodiments, configurations with a 20-30 MHz interval can be considered by the collision component 1002 to be near-collisions (e.g., such as the configurations labeled via points "e" and/or "f"). However, table 1104 demonstrates that renormalization of the near-collision CR gates due to such spectator collision can be found acceptable by the collision component 1002.

FIG. 12 illustrates a flow diagram of an example, non-limiting computer-implemented method 1200 that can facilitate tiling one or more CR gate configurations to one or more lattices that can characterize the topology of one or more quantum circuits. Repetitive description of like elements employed in other embodiments described herein is omitted for sake of brevity.

At 1202, the computer-implemented method 1200 can comprise receiving (e.g., via communications component 112), by a system 100 operatively coupled to one or more processors 120, one or more lattices that can characterize one or more quantum circuit topologies. In accordance with various embodiments described herein, the one or more lattices can comprise one or more nodes 202 connected via one or more connections 204 to characterize qubit connectivity of the one or more quantum circuits (e.g., as exemplified by heavy-hexagon lattice 200).

At 1204, the computer-implemented method 1200 can comprise generating (e.g., via tiling component 110), by the system 100, one or more CR gate configurations that can delineate one or more control qubit assignments and/or target qubit assignments in conjunction with a frequency allocation onto the one or more lattices. In accordance with various embodiments described herein, the computer-implemented method 1200 can define control and/or target qubit roles to the various qubits represented by the one or more lattices. For instance, the computer-implemented method 1200 can map (e.g., via role component 302) one or more CR directions (e.g., via CR direction arrows 402) to the one or more lattices to define the control and/or target qubit roles. Additionally, the method 1200 can set various parameters associated with each CR gate of the CR gate configuration. For instance, the computer-implemented method 1200 can define (e.g., via parameter component 802) one or more detuning values (e.g., control qubit-to-target qubit detuning values and/or spectator qubit detuning values) and/or anharmonicity values regarding each of the CR gates.

Figure 13:
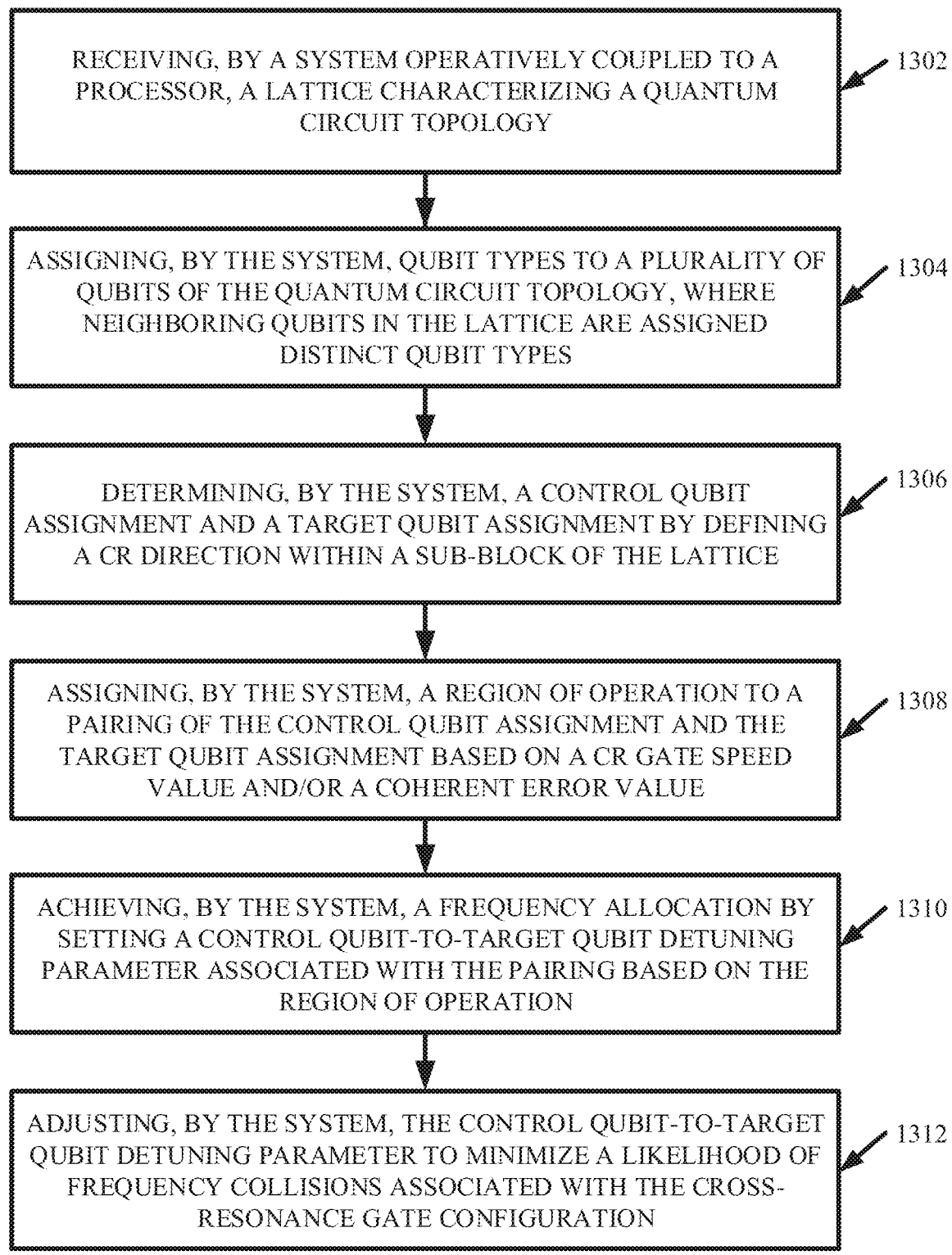
FIG. 13 illustrates a flow diagram of an example, non-limiting computer-implemented method that can facilitate tiling one or more cross-resonance gate configurations to one or more lattices characterizing the topology of one or more quantum circuits in accordance with one or more embodiments described herein.

FIG. 13 illustrates a flow diagram of an example, non-limiting computer-implemented method 1300 that can facilitate tiling one or more CR gate configurations to one or more lattices that can characterize the topology of one or more quantum circuits. Repetitive description of like elements employed in other embodiments described herein is omitted for sake of brevity.

At 1302, the computer-implemented method 1300 can comprise receiving (e.g., via communications component 112), by a system 100 operatively coupled to one or more processors 120, one or more lattices that can characterize one or more quantum circuit topologies. In accordance with various embodiments described herein, the one or more lattices can comprise one or more nodes 202 connected via one or more connections 204 to characterize qubit connectivity of the one or more quantum circuits (e.g., as exemplified by heavy-hexagon lattice 200).

At 1304, the computer-implemented method 1300 can comprise assigning (e.g., via qubit type component 114), by the system 100, qubit types to a plurality of qubits of the quantum circuit topology, where neighboring qubits in the lattice can be assigned distinct qubit types. In various embodiments, the number of qubit types assigned (e.g., via qubit type component 114) by the computer-implemented method 1300 can be based on the degree of connectivity experienced by the one or more lattices. At 1306, the computer-implemented method 1300 can comprise determining (e.g., via role component 302), by the system 100, one or more control qubit assignments and/or target qubit assignments by defining one or more CR directions within one or more sub-block of the one or more lattices. For instance, at least FIG. 4 exemplifies that the one or more CR directions can be mapped onto the one or more connections 204 of the one or more lattices (e.g., heavy-hexagon lattice 200). In one or more embodiments, the one or more CR direction assignments can be allocated in accordance with one or more patterns.

At 1308, the computer-implemented method 1300 can comprise assigning (e.g., via region component 502), by the system 100, a region of operation to a pairing of the control qubit assignment and the target qubit assignment based on a CR gate speed value (e.g., ZZ rate) and/or coherent error value. In various embodiments, the assigning at 1308 can assign the pairings to a region from the five regions depicted in FIG. 6. At 1310, the computer-implemented method 1300 can comprise achieving (e.g., via parameter component 802), by the system 100, one or more frequency allocations by setting one or more control qubit-to-target qubit detuning value parameters associated with the pairing based on the region of operation assigned at 1308. At 1312, the computer-implemented method 1300 can comprise adjusting (e.g., via collision component 1002), by the system 100, the control qubit-to-target qubit detuning parameter to minimize a likelihood of frequency collisions associated with the CR gate configuration. For example, the adjusting at 1314 can alter one or more detuning values and/or anharmonicity values of the CR gate configuration such that frequency differences between control qubits and spectator qubits and/or target qubits and spectator qubits are greater than one or more defined thresholds (e.g., set via one or more input devices 106).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
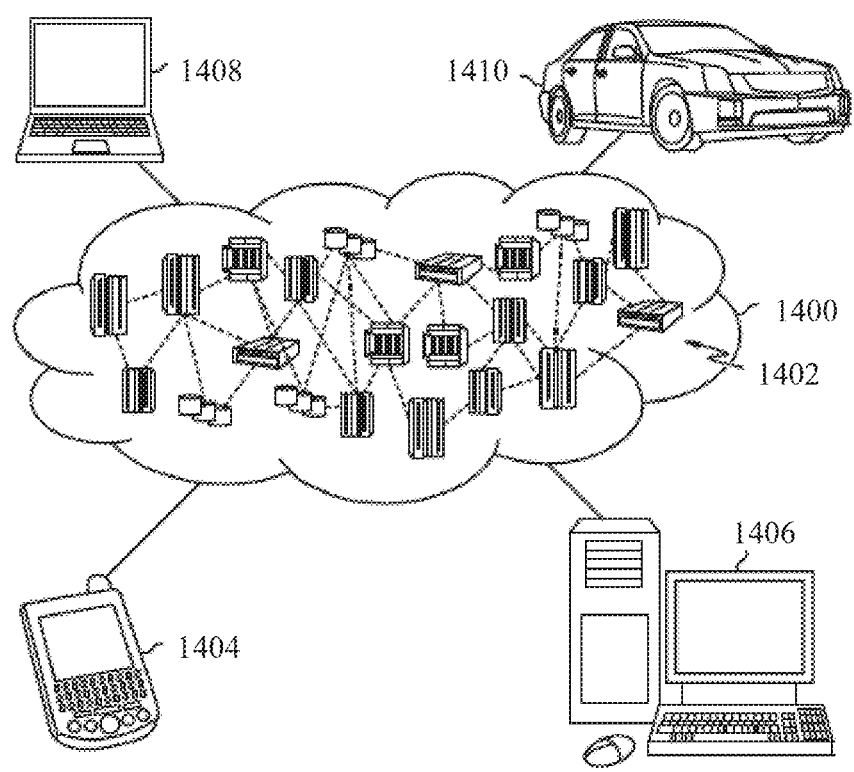
FIG. 14 depicts a cloud computing environment in accordance with one or more embodiments described herein.

Referring now to FIG. 14, illustrative cloud computing environment 1400 is depicted. As shown, cloud computing environment 1400 includes one or more cloud computing nodes 1402 with which local computing devices used by cloud consumers, such as, for example, personal digital assistant (PDA) or cellular telephone 1404, desktop computer 1406, laptop computer 1408, and/or automobile computer system 1410 may communicate. Nodes 1402 may communicate with one another. They may be grouped (not shown) physically or virtually, in one or more networks, such as Private, Community, Public, or Hybrid clouds as described hereinabove, or a combination thereof. This allows cloud computing environment 1400 to offer infrastructure, platforms and/or software as services for which a cloud consumer does not need to maintain resources on a local computing device. It is understood that the types of computing devices 1404-1410 shown in FIG. 14 are intended to be illustrative only and that computing nodes 1402 and cloud computing environment 1400 can communicate with any type of computerized device over any type of network and/or network addressable connection (e.g., using a web browser).

Figure 15:
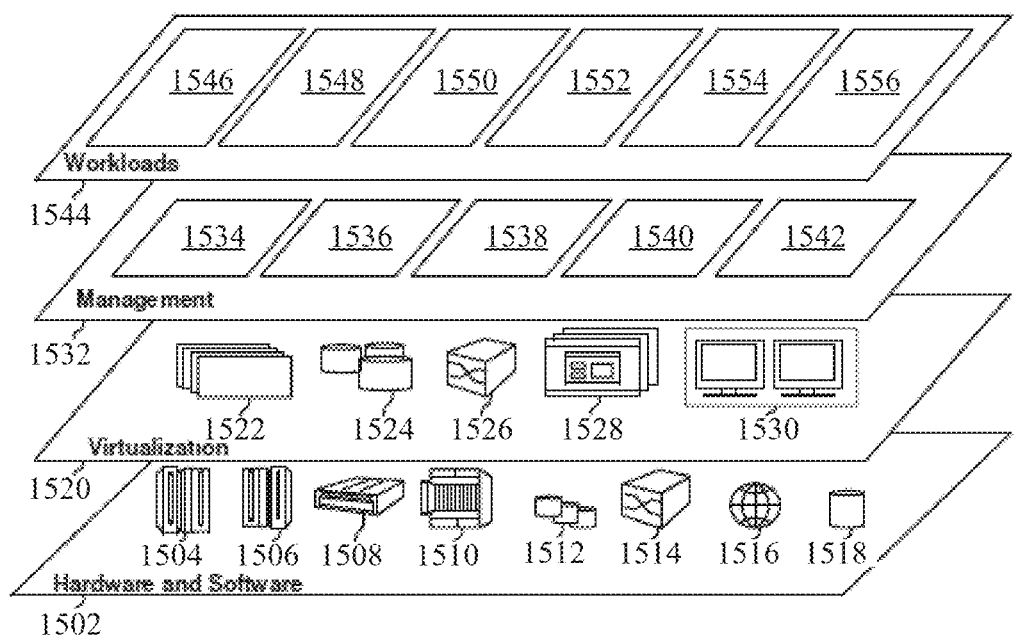
FIG. 15 depicts abstraction model layers in accordance with one or more embodiments described herein.

Referring now to FIG. 15, a set of functional abstraction layers provided by cloud computing environment 1400 (FIG. 14) is shown. Repetitive description of like elements employed in other embodiments described herein is omitted for sake of brevity. It should be understood in advance that the components, layers, and functions shown in FIG. 15 are intended to be illustrative only and embodiments of the invention are not limited thereto. As depicted, the following layers and corresponding functions are provided.

Hardware and software layer 1502 includes hardware and software components. Examples of hardware components include: mainframes 1504; RISC (Reduced Instruction Set Computer) architecture based servers 1506; servers 1508; blade servers 1510; storage devices 1512; and networks and networking components 1514. In some embodiments, software components include network application server software 1516 and database software 1518.

Virtualization layer 1520 provides an abstraction layer from which the following examples of virtual entities may be provided: virtual servers 1522; virtual storage 1524; virtual networks 1526, including virtual private networks; virtual applications and operating systems 1528; and virtual clients 1530.

In one example, management layer 1532 may provide the functions described below. Resource provisioning 1534 provides dynamic procurement of computing resources and other resources that are utilized to perform tasks within the cloud computing environment. Metering and Pricing 1536 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1538 provides access to the cloud computing environment for consumers and system administrators. Service level management 1540 provides cloud computing resource allocation and management such that required service levels are met. Service Level Agreement (SLA) planning and fulfillment 1542 provide pre-arrangement for, and procurement of, cloud computing resources for which a future requirement is anticipated in accordance with an SLA.

Workloads layer 1544 provides examples of functionality for which the cloud computing environment may be utilized. Examples of workloads and functions which may be provided from this layer include: mapping and navigation 1546; software development and lifecycle management 1548; virtual classroom education delivery 1550; data analytics processing 1552; transaction processing 1554; and CR gate tiling operations 1556. Various embodiments of the present invention can utilize the cloud computing environment described with reference to FIGS. 14 and 15 to tile one or more CR gate configurations to one or more lattices that characterize the topology of one or more quantum circuits.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 16:
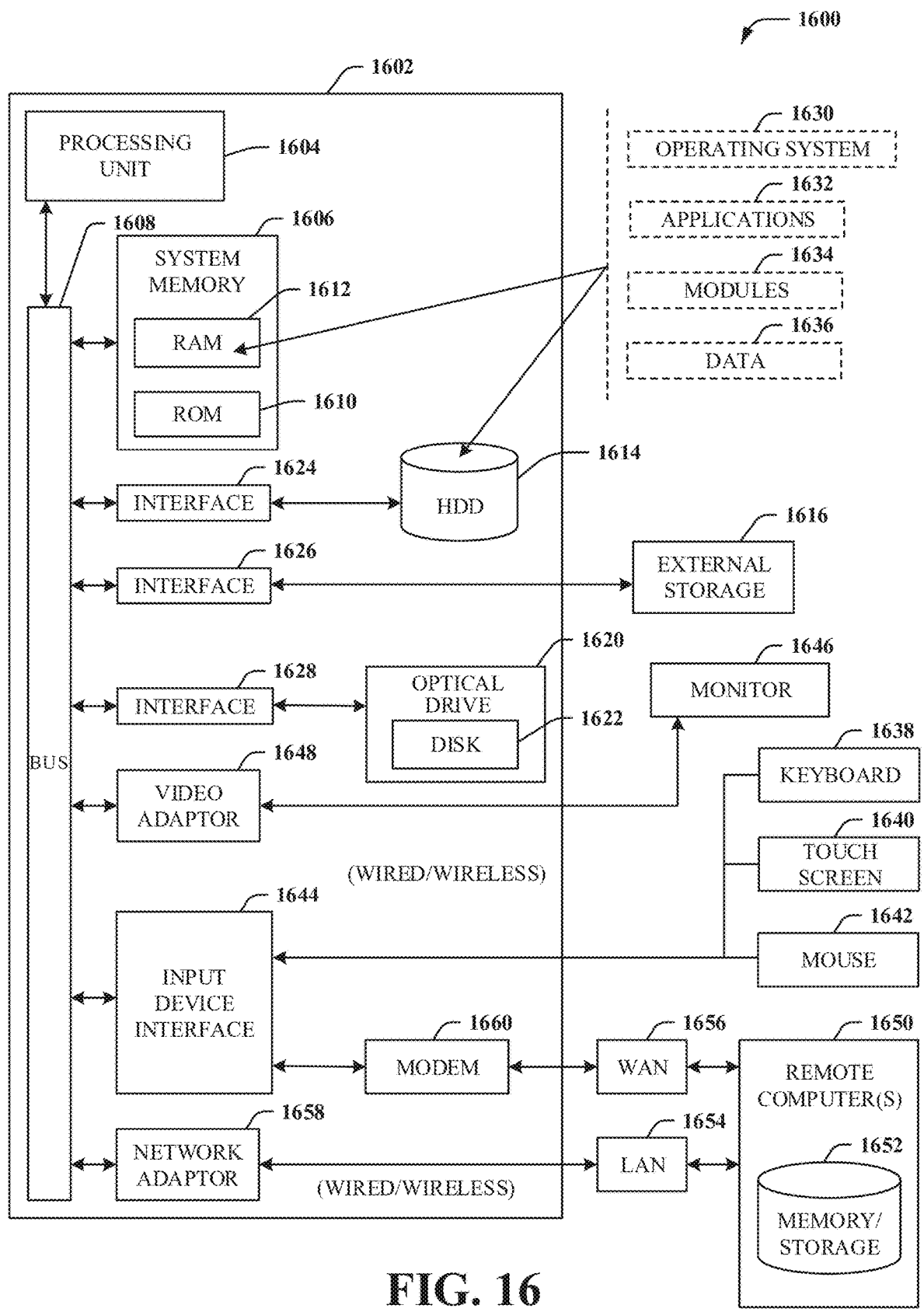
FIG. 16 illustrates a block diagram of an example, non-limiting operating environment in which one or more embodiments described herein can be facilitated.

In order to provide additional context for various embodiments described herein, FIG. 16 and the following discussion are intended to provide a general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system ("BIOS") can be stored in a non-volatile memory such as ROM, erasable programmable read only memory ("EPROM"), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive ("HDD") 1614 (e.g., EIDE, SATA), one or more external storage devices 1616 (e.g., a magnetic floppy disk drive ("FDD") 1616, a memory stick or flash drive reader, a memory card reader, a combination thereof, and/or the like) and an optical disk drive 1620 (e.g., which can read or write from a CD-ROM disc, a DVD, a BD, and/or the like). While the internal HDD 1614 is illustrated as located within the computer 1602, the internal HDD 1614 can also be configured for external use in a suitable chassis (not shown). Additionally, while not shown in environment 1600, a solid state drive ("SSD") could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine ("VM") of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1602, e.g., applied at the application execution level or at the operating system ("OS") kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, and/or the like.

A monitor 1646 or other type of display device can be also connected to the system bus 1608 via an interface, such as a video adapter 1648. In addition to the monitor 1646, a computer typically includes other peripheral output devices (not shown), such as speakers, printers, a combination thereof, and/or the like.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network ("LAN") 1654 and/or larger networks, e.g., a wide area network ("WAN") 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point ("AP") disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/ storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
      a tiling component that generates an optimal tiling of cross-resonance gates for a quantum circuit topology, wherein the optimal tiling concurrently maximizes pairwise cross-resonance gate speeds of the cross-resonance gates, minimizes pairwise cross-resonance gate errors of the cross-resonance gates, and minimizes multi-qubit frequency collisions of the cross-resonance gates, and wherein generating the optimal tiling comprises:
         generating a cross-resonance gate configuration that delineates control qubit assignments and target qubit assignments in conjunction with a frequency allocation onto a heavy lattice characterizing the quantum circuit topology; and
         assigning qubit types to qubits of the heavy lattice, wherein:
            respective qubits in each pair of nearest neighboring qubits of the heavy lattice comprises distinct qubit types, and
            respective qubits in each pair of next-nearest neighboring qubits of the heavy lattice comprises distinct qubit types.

2. The system of claim 1, wherein the control qubit assignments and the target qubit assignments assign control roles and target roles to the qubits of the heavy lattice heavy lattice.

3. The system of claim 1, further comprising:
   a role component that determines the control qubit assignments and the target qubit assignments by defining a cross-resonance direction within a sub-block of the heavy lattice.

4. The system of claim 3, further comprising:
   a region component that assigns a region of operation to a pairing of the control qubit assignments and the target qubit assignments based on a cross-resonance gate speed value and a coherent error value.

5. The system of claim 4, further comprising:
   a parameter component that achieves the frequency allocation by setting a control qubit-to-target qubit detuning parameter associated with the pairing based on the region of operation.

6. The system of claim 5, further comprising:
   a collision component that adjusts the control qubit-to-target qubit detuning parameter to minimize a likelihood of frequency collisions associated with the cross-resonance gate configuration.

7. The system of claim 5, wherein the heavy lattice is a heavy-hexagon lattice, wherein the role component assigns five of the distinct qubit types, and wherein adjacent control qubit-to-target qubit detuning parameters on an edge of the heavy-hexagon lattice alternates between a first region of operation and a second region of operation.

8. A computer-implemented method, comprising:
   generating, by a system operatively coupled to a processor, an optimal tiling of cross-resonance gates for a quantum circuit topology, wherein the optimal tiling concurrently maximizes pairwise cross-resonance gate speeds of the cross-resonance gates, minimizes pairwise cross-resonance gate errors of the cross-resonance gates, and minimizes multi-qubit frequency collisions of the cross-resonance gates, and wherein generating the optimal tiling comprises:
      generating a cross-resonance gate configuration that delineates control qubit assignments and target qubit assignments in conjunction with a frequency allocation onto a heavy lattice characterizing the quantum circuit topology; and assigning qubit types to qubits of the heavy lattice, wherein:
- respective qubits in each pair of nearest neighboring qubits of the heavy lattice comprises distinct qubit types, and
- respective qubits in each pair of next-nearest neighboring qubits of the heavy lattice comprises distinct qubit types.

9. The computer-implemented method of claim 8, wherein the control qubit assignments and the target qubit assignments assign control roles and target roles to qubits of the heavy lattice.

10. The computer-implemented method of claim 8, further comprising:
determining, by the system, the control qubit assignments and the target qubit assignments by defining a cross-resonance direction within a sub-block of the heavy lattice.

11. The computer-implemented method of claim 10, further comprising:
assigning, by the system, a region of operation to a pairing of the control qubit assignments and the target qubit assignments based on a cross-resonance gate speed value and a coherent error value.

12. The computer-implemented method of claim 11, further comprising:
achieving, by the system, the frequency allocation by setting a control qubit-to-target qubit detuning parameter associated with the pairing based on the region of operation.

13. The computer-implemented method of claim 12, further comprising:
adjusting, by the system, the control qubit-to-target qubit detuning parameter to minimize a likelihood of frequency collisions associated with the cross-resonance gate configuration.

14. The computer-implemented method of claim 12, wherein the heavy lattice is a heavy-hexagon lattice, wherein five distinct qubit types are assigned, and wherein adjacent control qubit-to-target qubit detuning parameters on an edge of the heavy-hexagon lattice alternates between a first region of operation and a second region of operation.

15. A computer program product for tiling cross-resonance gates for a quantum circuit topology, the computer program product comprising a computer readable storage medium having program instructions embodied therewith, the program instructions executable by a processor to cause the processor to:
generate, by the processor, an optimal tiling of the cross-resonance gates for the quantum circuit topology, wherein the optimal tiling concurrently maximizes pairwise cross-resonance gate speeds of the cross-resonance gates, minimizes pairwise cross-resonance gate errors of the cross-resonance gates, and minimizes multi-qubit frequency collisions of the cross-resonance gates, and wherein generating the optimal tiling comprises:
generating a cross-resonance gate configuration that delineates control qubit assignments and target qubit assignments in conjunction with a frequency allocation onto a heavy lattice characterizing the quantum circuit topology; and
assigning qubit types to qubits of the heavy lattice, wherein:
- respective qubits in each pair of nearest neighboring qubits of the heavy lattice comprises distinct qubit types, and
- respective qubits in each pair of next-nearest neighboring qubits of the heavy lattice comprises distinct qubit types.

16. The computer program product of claim 15, wherein the control qubit assignments and the target qubit assignments assign control roles and target roles to qubits of the heavy lattice.

17. The computer program product of claim 15, wherein the program instructions further cause the processor to:
determine, by the processor, the control qubit assignments and the target qubit assignments by defining a cross-resonance direction within a sub-block of the heavy lattice.

18. The computer program product of claim 17, wherein the program instructions further cause the processor to:
assign, by the processor, a region of operation to a pairing of the control qubit assignments and the target qubit assignments based on a cross-resonance gate speed value and a coherent error value.

19. The computer program product of claim 18, wherein the program instructions further cause the processor to:
achieve, by the processor, the frequency allocation by setting a control qubit-to-target qubit detuning parameter associated with the pairing based on the region of operation; and
adjust, by the processor, the control qubit-to-target qubit detuning parameter to minimize a likelihood of frequency collisions associated with the cross-resonance gate configuration.

20. The computer program product of claim 19, wherein the heavy lattice is a heavy-hexagon lattice, wherein five distinct qubit types are assigned, and wherein adjacent control-target detuning parameters on an edge of the heavy-hexagon lattice alternates between a first region of operation and a second region of operation.

* * * * *